United States Patent
Lee et al.

(10) Patent No.: US 10,925,083 B2
(45) Date of Patent: Feb. 16, 2021

(54) METHOD OF TRANSMITTING AND RECEIVING DOWNLINK SIGNAL BETWEEN USER EQUIPMENT AND BASE STATION IN WIRELESS COMMUNICATION SYSTEM, AND APPARATUS FOR SUPPORTING THE SAME

(71) Applicant: LG Electronics Inc., Seoul (KR)

(72) Inventors: Kilbom Lee, Seoul (KR); Kyuseok Kim, Seoul (KR); Hyungtae Kim, Seoul (KR); Jiwon Kang, Seoul (KR); Jonghyun Park, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/822,904

(22) Filed: Mar. 18, 2020

(65) Prior Publication Data
US 2020/0221487 A1    Jul. 9, 2020

Related U.S. Application Data

(63) Continuation of application No. PCT/KR2019/009395, filed on Jul. 29, 2019.

(30) Foreign Application Priority Data

Jul. 30, 2018   (KR) .................. 10-2018-0088863
Aug. 3, 2018    (KR) .................. 10-2018-0090980

(51) Int. Cl.
*H04W 72/12*   (2009.01)
*H04L 5/00*    (2006.01)

(52) U.S. Cl.
CPC ....... *H04W 72/1289* (2013.01); *H04L 5/0048* (2013.01)

(58) Field of Classification Search
None
See application file for complete search history.

(56) References Cited

U.S. PATENT DOCUMENTS

| 2015/0215905 | A1  | 7/2015  | Park et al. |
| 2018/0343653 | A1* | 11/2018 | Guo .............. H04L 5/0053 |
| 2019/0319692 | A1* | 10/2019 | Noh .............. H04L 25/03 |
| 2020/0177416 | A1* | 6/2020  | Jiang ............ H04L 27/2613 |

OTHER PUBLICATIONS

Catt, "Remaining issues on QCL," R1-1806287, 3GPP TSG RAN WG1 Meeting #93, Busan, Korea, dated May 21-25, 2018, 8 pages.

(Continued)

*Primary Examiner* — Scott M Sciacca
(74) *Attorney, Agent, or Firm* — Fish & Richardson P.C.

(57) ABSTRACT

Disclosed are a method of transmitting and receiving a downlink between a user equipment (UE) and a base station (BS) in a wireless communication system, and an apparatus for supporting the same. According to an embodiment applicable to the present disclosure, when the UE recognizes that plural transmission configuration indication (TCI) states related to one reference signal set are allocated to the UE through received downlink control information (DCI), the UE may receive/acquire a first physical downlink shared channel (PDSCH) scheduled by the DCI with high reliability.

10 Claims, 20 Drawing Sheets

(56) References Cited

OTHER PUBLICATIONS

Oppo, "Remaining Issues and Text Proposals for Beam Management," R1-1806840, 3GPP TSG RAN WG1 Meeting #93, Busan, Korea, dated May 21-25, 2018, 8 pages.
Oppo, "Text Proposal for QCL," R1-1806844, 3GPP TSG RAN WG1 Meeting #93, Busan, Korea, dated May 21-25, 2018, 6 pages.
Zte, "Remaining issues on beam management," R1-1805828, 3GPP TSG RAN WG1 Meeting #93, Busan, Korea, dated May 21-25, 2018, 7 pages.

* cited by examiner

METHOD OF TRANSMITTING AND RECEIVING DOWNLINK SIGNAL BETWEEN USER EQUIPMENT AND BASE STATION IN WIRELESS COMMUNICATION SYSTEM, AND APPARATUS FOR SUPPORTING THE SAME

CROSS-REFERENCE TO RELATED APPLICATIONS

This application is a continuation of International Application No. PCT/KR2019/009395, filed on Jul. 29, 2019, which claims the benefit of Korean Application No. 10-2018-0090980, filed on Aug. 3, 2018, and Korean Application No. 10-2018-0088863, filed on Jul. 30, 2018. The disclosures of the prior applications are incorporated by reference in their entirety.

TECHNICAL FIELD

The following description relates to a wireless communication system and, more particularly, to a method of transmitting and receiving a downlink between a user equipment (UE) and a base station in a wireless communication system, and an apparatus for supporting the same.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced.

Thus, eMBB communication, massive MTC, ultra-reliable and low-latency communication (URLLC), etc. have been introduced. In particular, various configurations for a phase tracking reference signal (PT-RS) to estimate phase noise between a UE and base station (BS) in various frequency bands are under discussion in consideration of a signal transmission and reception method in the various frequency bands.

The present disclosure may be related to the following technical configurations.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues.

Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting UE, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HIVID), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

SUMMARY

An object of the present disclosure is to provide a method of a method of transmitting and receiving a downlink signal between a user equipment and a base station in a wireless communication system, and an apparatus for supporting the same.

The technical objects that can be achieved through the present disclosure are not limited to what has been particularly described hereinabove and other technical objects not described herein will be more clearly understood by persons skilled in the art from the following detailed description.

The present disclosure provides a method of transmitting and receiving a downlink signal between a user equipment and a base station in a wireless communication system, and an apparatus for supporting the same.

According to an aspect of the present disclosure, provided herein is a method of receiving a downlink signal by a user equipment (UE) in a wireless communication system, including receiving downlink control information (DCI) for scheduling one or more physical downlink shared channels (PDSCHs); assuming that a second PDSCH scheduled for the UE is present so as to overlap with a first PDSCH scheduled by the DCI on a time resource, based on a plurality of transmission configuration indication (TCI) states related to one reference resource (RS) set, the plurality of TCI states being allocated to the UE by the DCI; and receiving the first PDSCH based on one of RS sets related to (i) the assumption and (ii) the plurality of TCI states.

The method of receiving a downlink signal may further include receiving the second PDSCH, The second PDSCH may be scheduled by the DCI or another DCI.

Based on the first PDSCH and the second PDSCH overlapping on a frequency resource as well as on the time resource, the UE may differently configure a first reception beam for the first PDSCH and a second reception beam for the second PDSCH to receive the first PDSCH and the second PDSCH.

The one RS set for receiving the first PDSCH may be determined as follows, based on determination that (i) the RS sets related to the plurality of TCI states correspond to two RS sets and (ii) one or more demodulation reference signal (DMRS) ports indicated by the DCI are included in different code division multiplexing (CDM) groups.

The one RS set for receiving the first PDSCH may be determined as a first RS set of the two RS sets, based on one or more DMRS ports related to the first PDSCH, included in a first CDM group.

The one RS set for receiving the first PDSCH is determined as a second RS set of the two RS sets, based on one or more DMRS ports related to the first PDSCH, included in a second CDM group.

The UE may receive the second PDSCH scheduled by the DCI. The second PDSCH may be received based on an RS set different from the one RS set for receiving the first PDSCH among the two RS sets.

The first CDM group and the second CDM group may be configured as follows, based on a first DMRS configuration type configured for the UE.

The first CDM group may include DMRS port #0, DMRS port #1, DMRS port #4, and DMRS port #5.

The second CDM group may include DMRS port #2, DMRS port #3, DMRS port #6, and DMRS port #7.

The first CDM group and the second CDM group may be configured as follows, based on a second DMRS configuration type configured for the UE.

The first CDM group may include DMRS port #0, DMRS port #1, DMRS port #6, and DMRS port #7

The second CDM group may include DMRS port #2, DMRS port #3, DMRS port #4, DMRS port #5, DMRS port #8, DMRS port #9, DMRS port #10, and DMRS port #11.

Based on determination that (i) the RS sets related to the plurality of TCI states correspond to two RS sets and (ii) one or more demodulation reference signal (DMRS) ports indicated by the DCI are included in one code division multiplexing (CDM) group, the one RS set for receiving the first PDSCH may be determined as one specific RS set of the two RS sets, without considering the one CDM group.

The one specific RS set for receiving the first PDSCH may be determined as a first RS set or a second RS set among the two RS sets.

Based on determination that (i) the RS sets related to the plurality of TCI states correspond to two RS sets and (ii) one or more demodulation reference signal (DMRS) ports indicated by the DCI are included in one code division multiplexing (CDM) group, the one RS set for receiving the first PDSCH may be determined as a first RS set or a second RS set of the two RS sets, based on one CDM group corresponding to a first CDM group or a second CDM group.

The one RS set for receiving the first PDSCH may be determined as follows according to whether the one CDM group to which the one or more DMRS ports indicated by the DCI is included in the first CDM group or the second CDM group.

The one RS set for receiving the first PDSCH may be determined as the first RS set of the two RS sets based on the one CDM group corresponding to the first CDM group.

The one RS set for receiving the first PDSCH may be determined as the second RS set of the two RS sets based on the one CDM group corresponding to the second CDM group.

The UE may receive the first PDSCH using a first reception beam for the first PDSCH determined based on the one RS set.

Overlapping of the first PDSCH and the second PDSCH on the time resource may include scheduling of the first PDSCH and the second PDSCH in at least one or more identical symbols.

In another aspect of the present disclosure, provided herein is a user equipment (UE) for receiving a downlink signal in a wireless communication system, including at least one receiver; at least one processor; and at least one memory operably connected to the at least one processor, for storing instructions for causing the at least one processor to perform a specific operation when the at least one processor is executed. The specific operation includes: receiving downlink control information (DCI) for scheduling one or more physical downlink shared channels (PDSCHs); assuming that a second PDSCH scheduled for the UE is present so as to overlap with a first PDSCH scheduled by the DCI on a time resource, based on a plurality of transmission configuration indication (TCI) states related to one reference resource (RS) set, the plurality of TCI states being allocated to the UE by the DCI; and receiving the first PDSCH based on one of RS sets related to (i) the assumption and (ii) the plurality of TCI states.

The UE may communicate with at least one of a mobile terminal, a network, or a self-driving vehicle other than a vehicle in which the UE is included.

In another aspect of the present disclosure, provided herein is a base station (BS) for transmitting a downlink signal in a wireless communication system, including at least one transmitter; at least one processor; and at least one memory operably connected to the at least one processor, for storing instructions for causing the at least one processor to perform a specific operation when the at least one processor is executed. The specific operation includes: transmitting downlink control information (DCI) for scheduling one or more physical downlink shared channels (PDSCHs) to a user equipment (UE), wherein a first PDSCH scheduled by the DCI overlaps with a second PDSCH scheduled for the UE by the DCI or another DCI on a time resource; and transmitting the first PDSCH and the second PDSCH to the UE.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to the present disclosure, even when a UE misses one of plural DCIs that schedule respective PDSCHs, the UE may recognize that a PDSCH scheduled by the missed DCI is present.

As a specific example, the UE may recognize whether plural PDSCHs are simultaneously scheduled for the UE during a predetermined time duration, based on the number of TCI states allocated (or scheduled) by at least one DCI. Therefore, the UE may raise the reliability of PDSCH reception through a reception method of minimizing interference between PDSCHs (e.g., respective reception filters are configured or different reception beams are defined).

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

DETAILED DESCRIPTION

Figure 1:
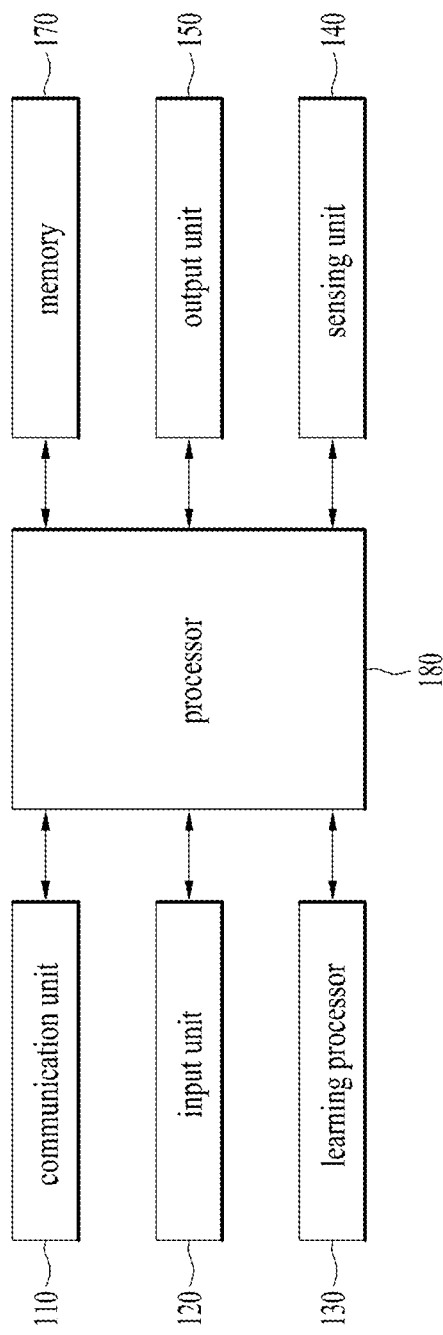
FIG. 1 illustrates an AI device according to an embodiment of the present disclosure.
Figure 2:
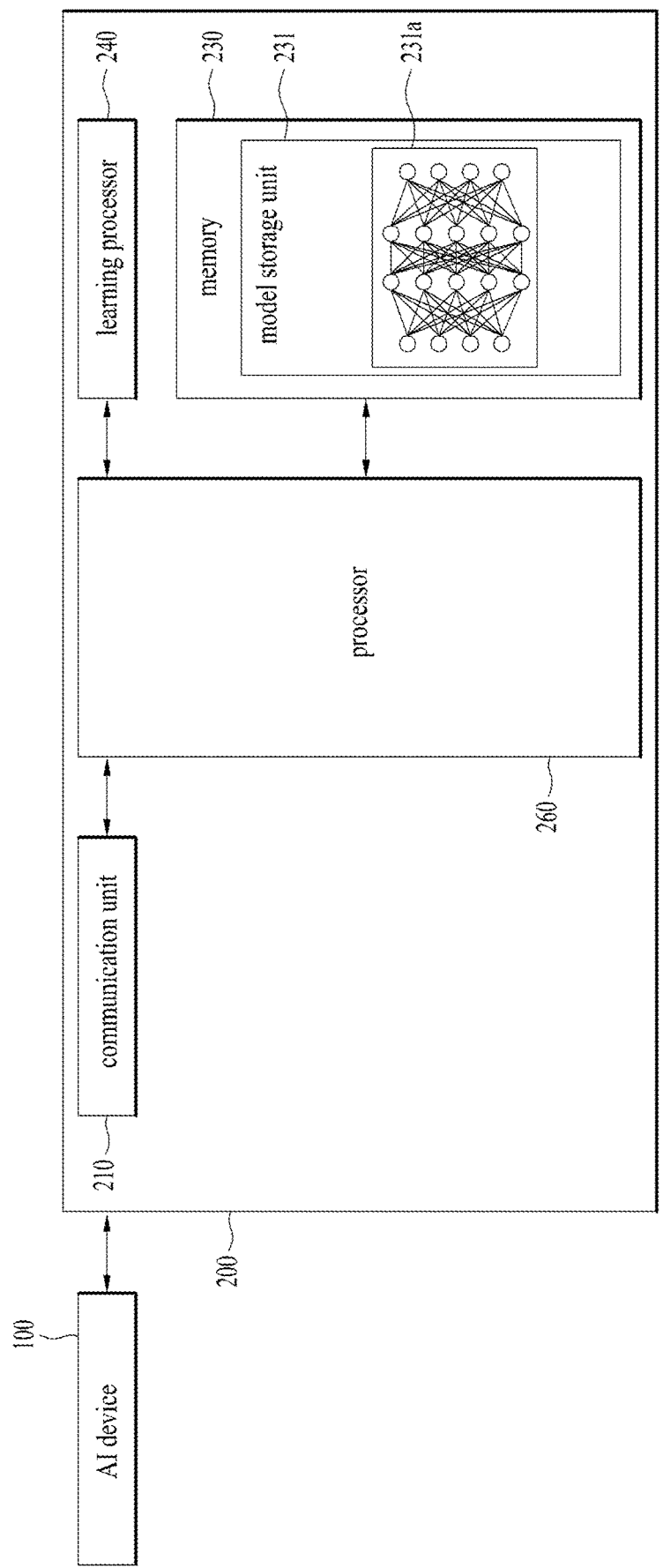
FIG. 2 illustrates an AI server according to an embodiment of the present disclosure.
Figure 3:
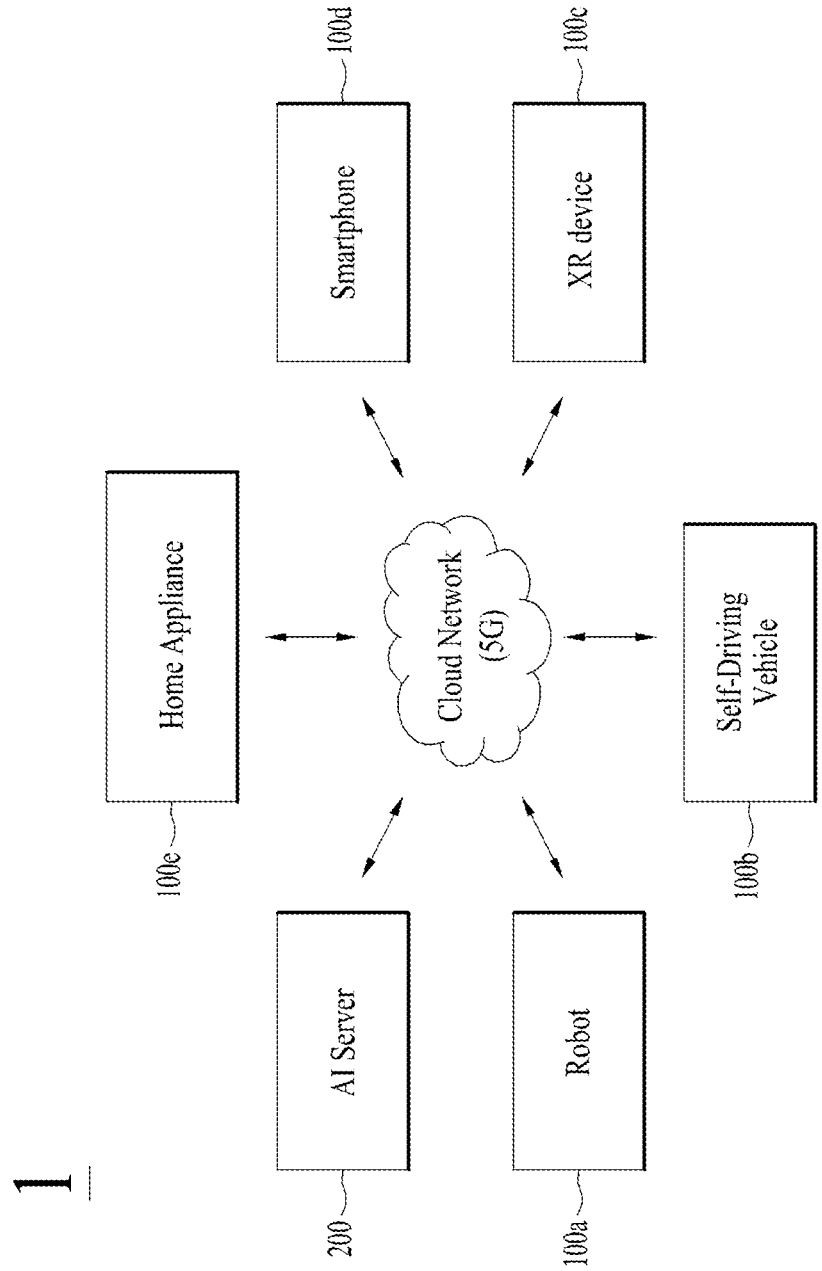
FIG. 3 illustrates an AI system according to an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term UE may be replaced with a UE, a Mobile Station (MS), a Subscriber Station (SS), a Mobile Subscriber Station (MSS), a mobile UE, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. NR System 1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

Figure 4:
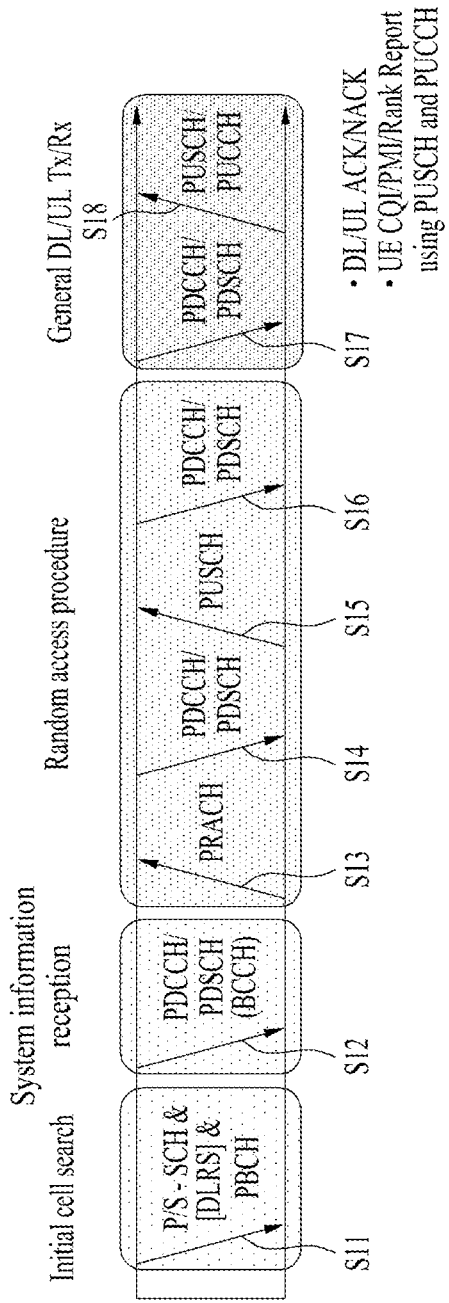
FIG. 4 is a diagram illustrating physical channels and a general signal transmission method using the physical channels.

FIG. 4 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARD) acknowledgement (ACK)/negative ACK (NACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

1.2. Radio Frame Structure

Figure 5:
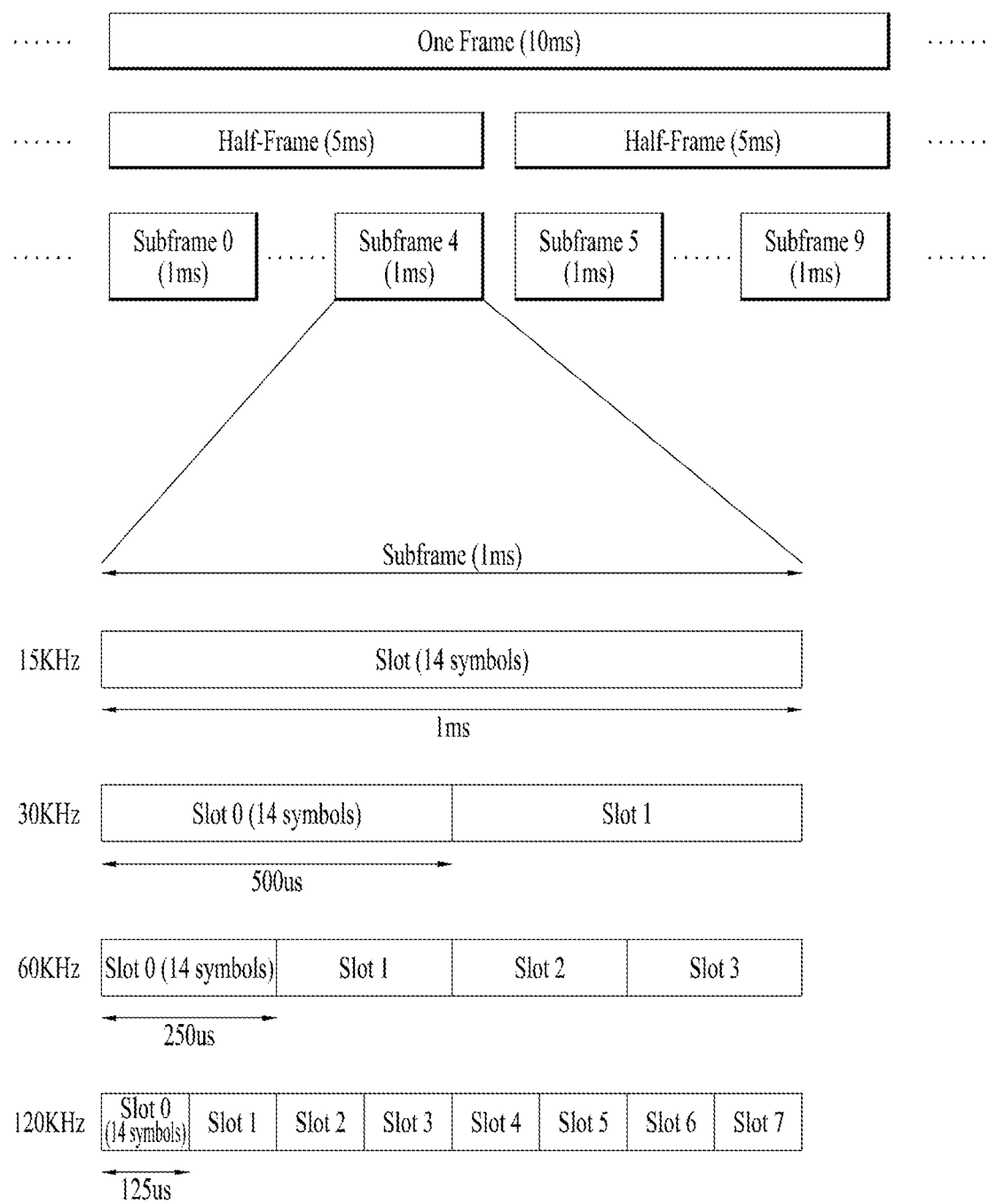
FIG. 5 is a diagram illustrating a radio frame structure in an NR system to which embodiments of the present disclosure are applicable.

FIG. 5 is a diagram illustrating a radio frame structure in an NR system to which embodiments of the present disclosure are applicable.

In the NR system, UL and DL transmissions are based on a frame as illustrated in FIG. 5. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{symb}^{frame, \mu}$ | $N_{slot}^{subframe, \mu}$ |
|---|---|---|---|
| 2 | 12 | 40 | 4 |

In the above tables, $N^{slot}_{symb}$ represents the number of symbols in a slot, $N^{frame,d}_{slot}$ represents the number of slots in a frame, and $N^{subframe}_{slot}$ represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 6:
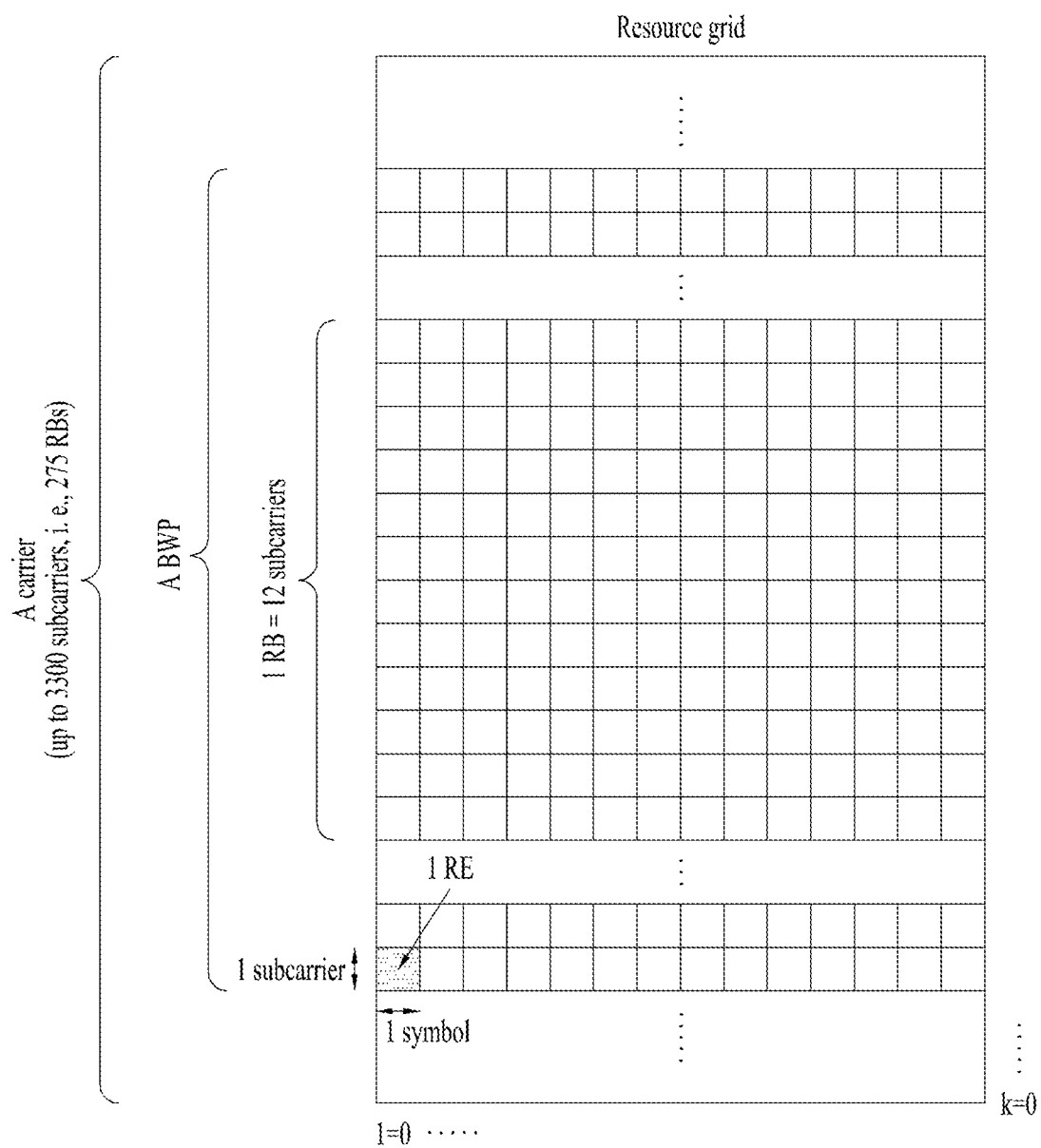
FIG. 6 is a diagram illustrating a slot structure in an NR system to which embodiments of the present disclosure are applicable.

FIG. 6 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 7:
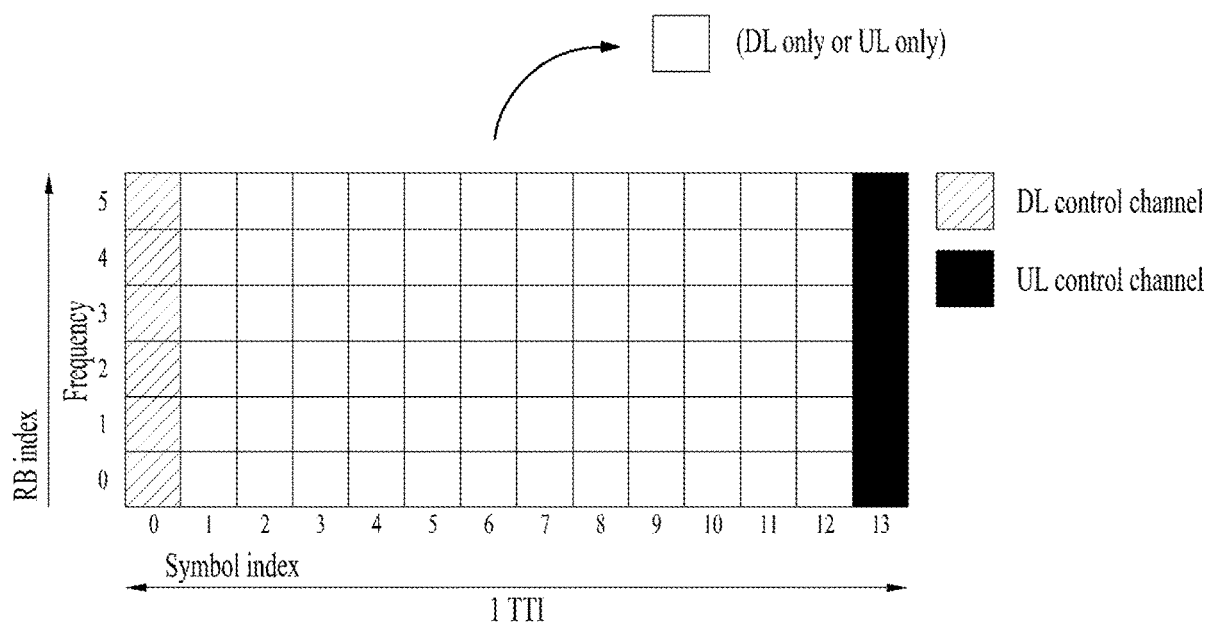
FIG. 7 is a diagram illustrating a self-contained slot structure in an NR system to which embodiments of the present disclosure are applicable.

FIG. 7 is a diagram illustrating a self-contained slot structures in an NR system to which embodiments of the present disclosure are applicable.

In FIG. 7, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Figure 8:
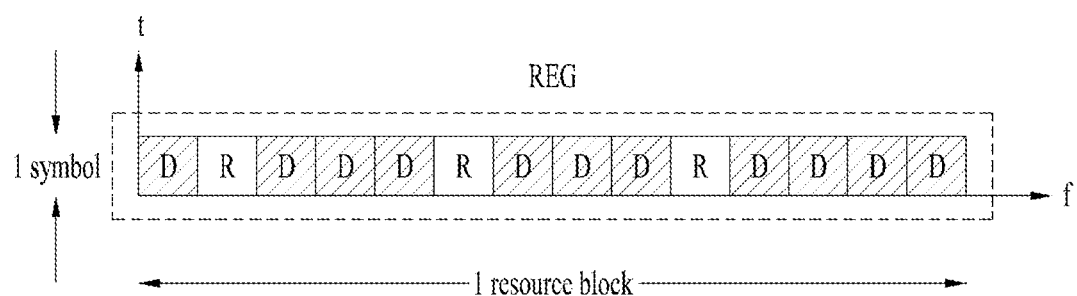
FIG. 8 is a diagram illustrating the structure of one REG in an NR system to which embodiments of the present disclosure are applicable.

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 8.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

FIG. 8 is a diagram illustrating the structure of one REG in an NR system to which embodiments of the present disclosure are applicable.

In FIG. 8, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

TABLE 3

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5 * 5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 9:
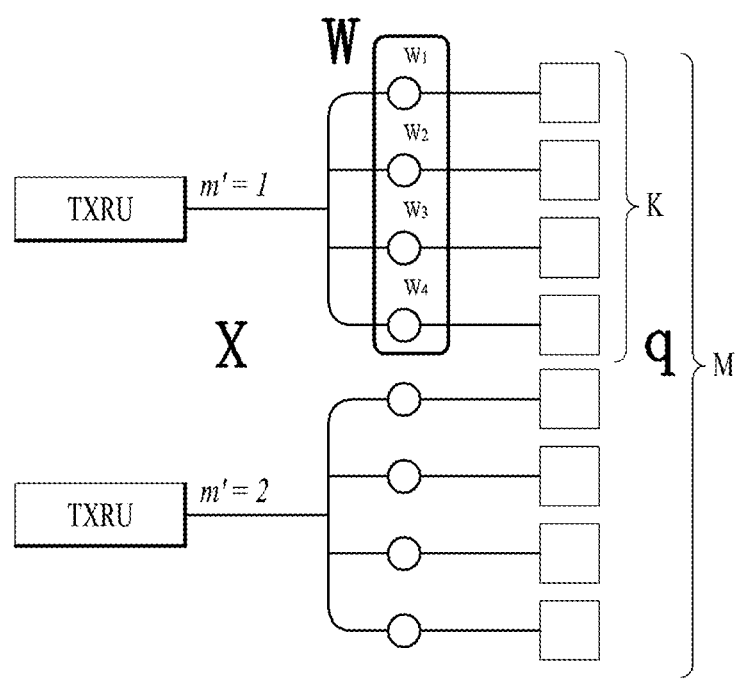
FIGS. 9 and 10 are diagrams illustrating representative methods for connecting TXRUs to antenna elements.
Figure 10:
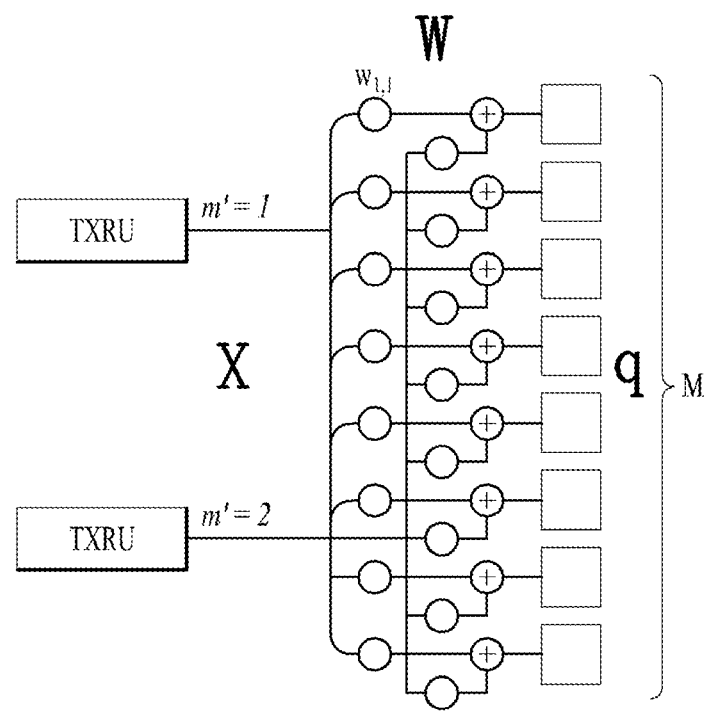

FIGS. 9 and 10 are diagrams illustrating representative methods for connecting TXRUs to antenna elements. Here, the TXRU virtualization model represents the relationship between TXRU output signals and antenna element output signals.

FIG. 9 shows a method for connecting TXRUs to sub-arrays. In FIG. 9, one antenna element is connected to one TXRU.

Meanwhile, FIG. 10 shows a method for connecting all TXRUs to all antenna elements. In FIG. 10, all antenna elements are connected to all TXRUs. In this case, separate addition units are required to connect all antenna elements to all TXRUs as shown in FIG. 10.

In FIGS. 9 and 10, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 9 has a disadvantage in that it is difficult to achieve beamforming focusing but has an advantage in that all antennas can be configured at low cost.

On the contrary, the configuration shown in FIG. 10 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 11:
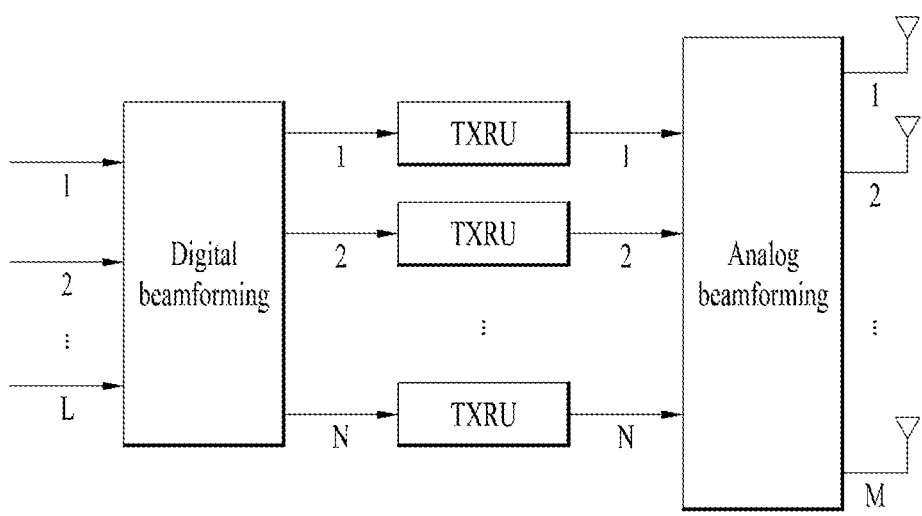
FIG. 11 is a diagram schematically illustrating an exemplary hybrid BF structure from the perspective of TXRUs and physical antennas according to the present disclosure.

FIG. 11 is a diagram schematically illustrating an exemplary hybrid BF structure from the perspective of TXRUs and physical antennas according to the present disclosure. In FIG. 11, the number of digital beams is L and the number analog beams is N.

Additionally, in the NR system to which the present disclosure is applicable, a BS designs analog BF to be changed in units of symbols to provide more efficient BF support to a UE located in a specific area. Furthermore, as illustrated in FIG. 11, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 12:
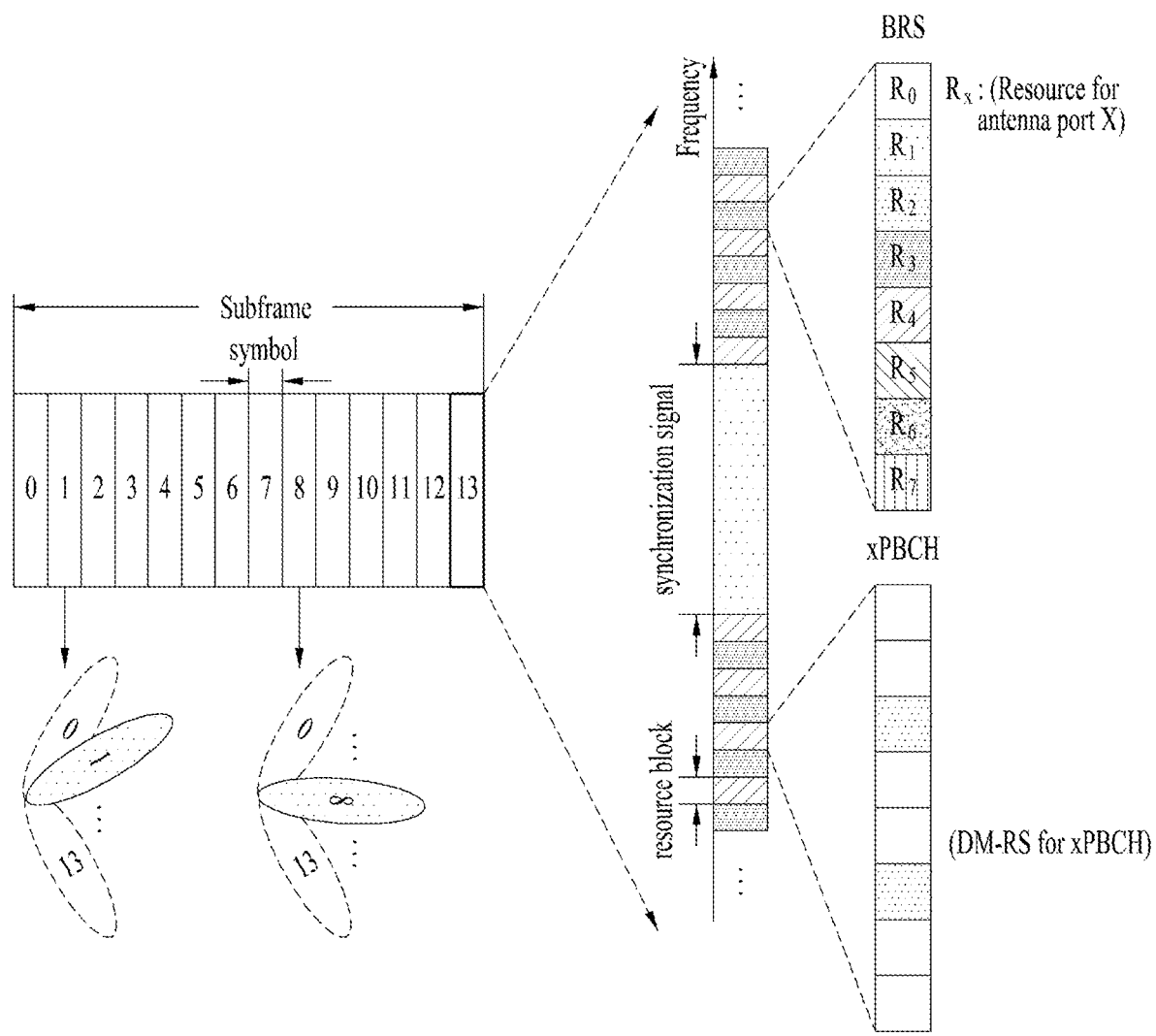
FIG. 12 is a diagram schematically illustrating an exemplary beam sweeping operation for a synchronization signal and system information in a DL transmission procedure according to the present disclosure.

FIG. 12 is a diagram schematically illustrating an exemplary beam sweeping operation for a synchronization signal and system information in a DL transmission procedure according to the present disclosure.

In FIG. 12 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 12, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Demodulation Reference Signal (DMRS)

In the NR system to which the present disclosure is applicable, a DMRS may be transmitted and received in a front-loaded structure. Alternatively, an additional DMRS may be transmitted and received in addition to the front-loaded DMRS.

The front-loaded DMRS may support fast decoding. The first OFDM symbol in which the front-loaded DMRS is carried may be determined as the third (e.g., 1=2) or fourth (e.g., 1=3) OFDM symbol. The first OFDM symbol position may be indicated by a PBCH.

The number of OFDM symbols in which the front-loaded DMRS is occupied may be indicated by a combination of DCI and radio resource control (RRC) signaling.

The additional DMRS may be configured for a high-speed UE. The additional DMRS may be positioned in the middle/last symbol(s) in a slot. If one front-loaded DMRS is configured, the additional DMRS may be allocated to 0 to 3 OFDM symbols. If two front-loaded DMRS symbols are configured, the additional DMRS may be allocated to 0 to 2 OFDM symbols.

The front-loaded DMRS may be divided into two types and one of the two types may be indicated through higher layer signaling (e.g., RRC signaling).

In the present disclosure, two DMRS configuration types may be applied. A DMRS configuration type which is substantially configured for the UE among the two DMRS configuration types may be indicated by higher layer signaling (e.g., RRC signaling).

DMRS configuration type 1 may be classified as follows according to the number of OFDM symbols to which the front-loaded DMRS is allocated.

DMRS configuration type 1 and number of OFDM symbols to which the front-loaded DMRS is allocated=1

Up to 4 ports (e.g., P0 to P3) may be multiplexed based on length-2 frequency code division multiplexing (F-CDM) and frequency division multiplexing (FDM) schemes. RS density may be set to 6 REs per port in a resource block (RB).

DMRS configuration type 1 and number of OFDM symbols to which the front-loaded DMRS is allocated=2

Up to 8 ports (e.g., P0 to P7) may be multiplexed based on length-2 F-CDM, length-2 time CDM (T-CDM), and FDM schemes. If presence of a PT-RS is configured by higher layer signaling, T-CDM may be fixed to [1 1]. RS density may be set to 12 REs per port in the RB.

DMRS configuration type 2 may be classified as follows according to the number of OFDM symbols to which the front-loaded DMRS is allocated.

DMRS configuration type 2 and number of OFDM symbols to which the front-loaded DMRS is allocated=1

Up to 6 ports (e.g., P0 to P5) may be multiplexed based on length-2 F-CDM and FDM schemes. RS density may be set to 4 REs per port in the RB.

DMRS configuration type 2 and number of OFDM symbols to which the front-loaded DMRS is allocated=2

Up to 12 ports (e.g., P0 to P11) may be multiplexed based on length-2 F-CDM, length-2 T-CDM, and FDM schemes. If presence of the PT-RS is configured by higher layer signaling, T-CDM may be fixed to [1 1]. RS density may be set to 8 REs per port in the RB.

Figure 13A:
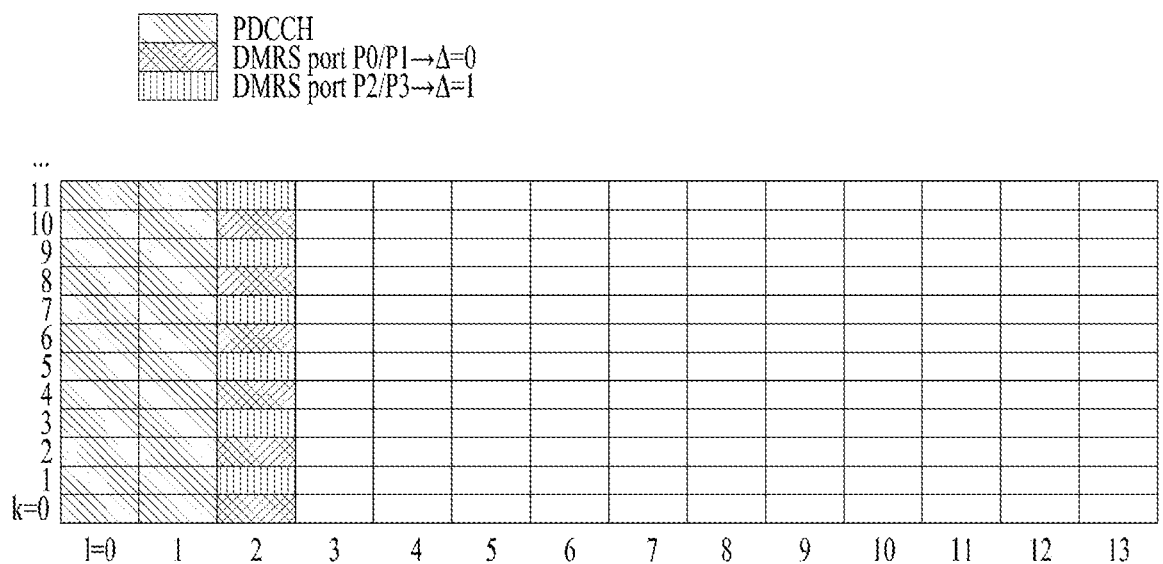
FIGS. 13A and 13B are diagrams schematically illustrating an example of a front loaded DMRS of a first DMRS configuration type applicable to the present disclosure.
Figure 13B:
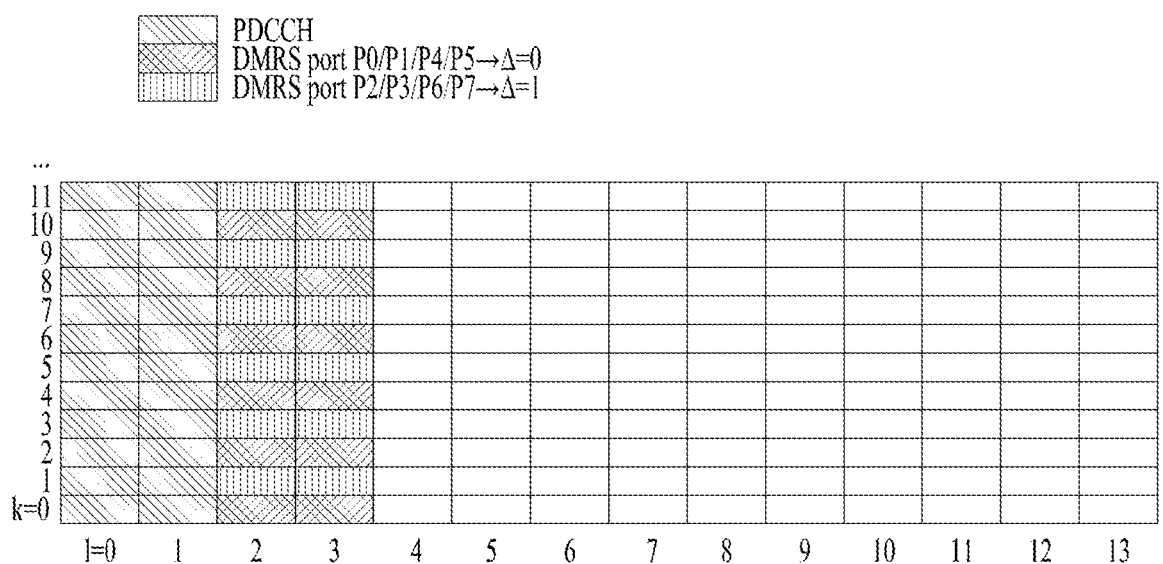

FIGS. 13A and 13B are diagrams schematically illustrating an example of a front loaded DMRS of a first DMRS configuration type applicable to the present disclosure.

More specifically, FIG. 13A illustrates a front-loaded DMRS with one symbol and FIG. 13B illustrates a front-loaded DMRS with two symbols.

In FIGS. 13A and 13B, A represents a DMRS offset value on the frequency axis. In this case, DMRS ports having the same DMRS offset A may be subjected to code division multiplexing in the frequency domain (CDM-F) or code division multiplexing in the time domain (CDM-T). In addition, DMRS ports having different DMRS offsets A may be subjected to CDM-F.

According to the present disclosure, CDM-F may be applied based on $w_f^{(k')}$ of the following table and CDM-T may be applied based on $w_t^{(l')}$ following table. In this case, k' and l' are parameter values for determining subcarrier indexes to which corresponding DMRSs are mapped and may have values of 0 or 1. In addition, DMRSs corresponding to respective DMRS ports may be classified into CDM groups as shown in the following tables as according to the DMRS configuration type.

Table 4 shows parameters for the first DMRS configuration type for a PDSCH and Table 5 shows parameters for the second DMRS configuration type for the PDSCH.

TABLE 4

| CDM group | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 5

| CDM group | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |

TABLE 5-continued

| CDM group | | | $w_f(k')$ | | $w_t(l')$ | |
|---|---|---|---|---|---|---|
| p | λ | Δ | k' = 0 | k' = 1 | l' = 0 | l' = 1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

A UE may acquire DMRS port configuration information configured by a BS through the DCI. For example, the UE may acquire the DMRS port configuration information through an antenna port field of DCI format 1_1, based on a DMRS configuration type (e.g., the first DMRS configuration type (dmrs-Type=1) or the second DMRS configuration type (dmrs-Type=2)) configured for the UE and the maximum number of OFDM symbols (e.g., maxLength=1 or maxLength=2) for a DL front-loaded DMRS. More specifically, Table 6 shows the DMRS port configuration information according to the value of the antenna port field when dmrs-Type=1 and maxLength=1 are configured for the UE. Table 7 shows the DMRS port configuration information according to the value of the antenna port field when dmrs-Type=1 and maxLength=2 are configured for the UE. Table 8 shows the DMRS port configuration information according to the value of the antenna port field when dmrs-Type=2 and maxLength=1 are configured for the UE. FIG. 9 shows the DMRS port configuration information according to the value of the antenna port field when dmrs-Type=2 and maxLength=2 are configured for the UE.

TABLE 6

| One Codeword: Codeword 0 enabled, Codeword 1 disabled | | |
|---|---|---|
| Value | Number of DMRS CDM group(s) without data | DMRS port(s) |
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |
| 10 | 2 | 0-3 |
| 11 | 2 | 0,2 |
| 12-15 | Reserved | Reserved |

TABLE 7

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |

TABLE 7-continued

| | One Codeword: Codeword 0 enabled, Codeword 1 disabled | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 8

| | One codeword: Codeword 0 enabled, Codeword 1 disabled | | | Two codewords: Codeword 0 enabled, Codeword 1 enabled | | |
|---|---|---|---|---|---|---|
| Value | Number of DMRS CDM group(s) without data | DMRS port(s) | Value | Number of DMRS CDM group(s) without data | DMRS port(s) | |
| 0 | 1 | 0 | 8 | 3 | 0-4 | |
| 1 | 1 | 1 | 1 | 3 | 0-5 | |
| 2 | 1 | 0,1 | 2-31 | reserved | reserved | |
| 3 | 9 | 0 | | | | |
| 4 | 2 | 1 | | | | |
| 5 | 2 | 2 | | | | |
| 6 | 2 | 3 | | | | |
| 7 | 2 | 0,1 | | | | |
| 8 | 2 | 2,3 | | | | |
| 9 | 9 | 0-2 | | | | |
| 10 | 9 | 0-3 | | | | |
| 11 | 3 | 0 | | | | |
| 12 | 3 | 1 | | | | |
| 13 | 3 | 2 | | | | |
| 14 | 3 | 3 | | | | |
| 15 | 3 | 4 | | | | |
| 16 | 3 | 5 | | | | |
| 17 | 3 | 0,1 | | | | |
| 18 | 3 | 2,3 | | | | |
| 19 | 3 | 4,5 | | | | |
| 20 | 3 | 0-2 | | | | |
| 21 | 3 | 3-5 | | | | |
| 22 | 3 | 0-3 | | | | |
| 23 | 2 | 0,2 | | | | |
| 24-31 | Reserved | Reserved | | | | |

TABLE 9

| | One codeword: Codeword 0 enabled, Codeword 1 disabled | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |

TABLE 9-continued

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

In this case, the UE may perform DMRS reception according to a condition as follows.

In DMRS configuration type 1,
one codeword may be scheduled for the UE and DCI indicating one of {2, 9, 10, 11, 30} may be allocated to the UE as an index value (e.g., an index value of Table 6 or Table 7) related to antenna port mapping.
If two codewords are scheduled for the UE,
the UE may receive a DMRS under the assumption that all other orthogonal antenna ports are not associated with PDSCH transmission to other UEs.

In DMRS setting type 2,
one codeword is scheduled for the UE and DCI indicating one of {2, 10, 23} may be allocated to the UE as an index value (e.g., an index value of Table 8 or Table 9) related to antenna port mapping.
If two codewords are scheduled for the UE,
the UE may receive a DMRS under the assumption that all other orthogonal antenna ports are not associated with PDSCH transmission to other UEs.

1.5. DCI Format

In the NR system to which the present disclosure is applicable, the following DCI formats may be supported. First, the NR system may support DCI format 0_0 and DCI format 0_1 as a DCI format for PUSCH scheduling and support DCI format 1_0 and DCI format 1_1 as a DCI format for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or code block group (CBG)-based (or CBG-level) PUSCH (in the case in which CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case in which CBG-based signal transmission and reception is configured).

In addition, DCI format 2_0 may be used to notify UEs of a slot format. DCI format 2_1 may be used to notify UEs of PRB(s) and OFDM symbol(s) in which a specific UE assumes that no transmission is intended therefor. DCI format 2_2 may be used to transmit transmission power control (TPC) commands for a PUCCH and a PUSCH. DCI format 2_3 may be used to transmit a group of TPC commands for SRS transmission by one or more UEs.

More specifically, DCI format 1_1 may include modulation and coding scheme (MCS)/new data indicator (NDI)/redundancy version (RV) fields for TB 1 and further include MCS/NDI/RV fields for TB 2 only when a higher layer parameter maxNrofCodeWordsScheduledByDCI in a higher layer parameter PDSCH-Config is set to n2 (i.e., 2).

In particular, when the higher layer parameter maxNrofCodeWordsScheduledByDCI is set to n2 (i.e., 2), whether a TB is substantially enabled/disabled may be determined by a combination of the MCS field and the RV field. More specifically, when the MCS field for a specific TB has a value of 26 and the RV field for the specific TB has a value of 1, the specific TB may be disabled.

Detailed features of the DCI formats may be supported by 3GPP TS 38.212. That is, obvious steps or parts which are not explained by DCI format-related features may be explained with reference to the above document. In addition, all terms disclosed in the present document may be explained by the above standard document.

1.6. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In addition, configuration information for CORESET 0 (e.g., common CORESET) may be configured by a higher layer parameter ControlResourceSetZero IE.

1.7. Antenna Port Quasi Co-Location

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI state contains parameters for configuring a quasi co-location (QCL) relationship between one or two DL reference signals and the DMRS ports of the PDSCH. The QCL relationship is configured by the higher layer parameter qcl-Type 1 for a first DL RS and a higher layer parameter qcl-Type2 for a second DL RS (if configured). For the case of two DL RSs, the QCL types should not be the same, regardless of whether the RSs are the same DL RS or different DL RSs. The QCL type corresponding to each DL RS is given by a higher layer parameter qcl-Type within a higher layer parameter QCL-Info and may have one of the following values.

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot #(n+3*$N^{subframe,\mu}_{slot+1}$). In this case, $N^{subframe,\mu}_{slot}$ is determined based on Table 1 or Table 2 described above. After the UE receives initial higher layer configuration of TCI states and before the UE receives the activation command, the UE assumes that DM-RS port(s) of a PDSCH of a serving cell are quasi co-located with an SS/PBCH block determined in the initial access procedure with respect to 'QCL-TypeA'. Additionally, the UE may assume that the DM-RS port(s) of the PDSCH of the serving cell are quasi co-located with the SS/PBCH block determined in the initial access procedure also with respect to 'QCL-TypeD' at the above timing.

If a higher layer parameter tci-PresentInDCI is set as 'enabled' for a CORESET scheduling the PDSCH, the UE assumes that the TCI field is present in a PDCCH of DCI format 1_1 transmitted on the CORESET. If the higher layer parameter tci-PresentInDCI is not configured for the CORESET scheduling the PDSCH or the PDSCH is scheduled by DCI format 1_0 and if a time offset between the reception of the DL DCI and the reception of the corresponding PDSCH is equal to or greater than a threshold Threshold-Sched-Offset (where the threshold is based on UE capability), for determining PDSCH antenna port QCL, the UE assumes that a TCI state or QCL assumption for the PDSCH is identical to a TCI state or QCL assumption applied to a CORESET used for PDCCH transmission.

If the higher layer parameter tci-PresentInDCI is set as 'enabled', the TCI field in the DCI scheduling a component carrier (CC) points to activated TCI states in the scheduled CC or a DL BW, and the PDSCH is scheduled by DCI format 1_1, the UE uses a TCI-state according to the TCI field in the DCI in a detected PDCCH to determine PDSCH antenna port QCL. The UE may assume that DMRS ports of the PDSCH of a serving cell are quasi co-located with RS(s) in the TCI state with respect to QCL type parameter(s) given by an indicated TCI state if the time offset between the reception of the DL DCI and the reception of the corresponding PDSCH is equal to or greater than the threshold Threshold-Sched-Offset (where the threshold is determined based on reported UE capability). When the UE is configured with a single slot PDSCH, the indicated TCI state should be based on the activated TCI states in a slot with the scheduled PDSCH. When the UE is configured with CORESET associated with a search space set for cross-carrier scheduling, the UE expects that the higher layer parameter tci-PresentInDci is set as 'enabled' for the CORESET. If one or more of the TCI states configured for the serving cell scheduled by the search space set contains 'QCL-TypeD', the UE expects the time offset between the reception of the detected PDCCH in the search space set and the reception of the corresponding PDSCH is greater than or equal to the threshold timeDurationForQCL.

For both the cases when higher layer parameter tci-PresentInDCI is set to 'enabled' and the higher layer parameter tci-PresentInDCI is not configured in RRC connected mode, if the offset between the reception of the DL DCI and the reception of the corresponding PDSCH is less than the threshold Threshold-Sched-Offset, the UE makes the following assumptions. (i) DM-RS ports of a PDSCH of a serving cell are quasi co-located with the RS(s) in a TCI state with respect to QCL parameter(s). (ii) In this case, the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, if the 'QCL-TypeD' of a PDSCH DM-RS is different from 'QCL-TypeD' of a PDCCH DM-RS with which overlapping occurs in at least one symbol, the UE is expected to prioritize the reception of the ePDCCH associated with the corresponding CORESET. This operation may also be applied to an intra-band CA case (when the PDSCH and the CORESET are in different CCs). If none of configured TCI states contains 'QCL-TypeD', the UE obtains the other QCL assumptions from the indicated TCI states for a scheduled PDSCH irrespective of the time offset between the reception of the DL DCI and the reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):

'QCL-TypeC' with an SS/PBCH block and, when (QCL-TypeD) is applicable, 'QCL-TypeD' with the same SS/PBCH block, or 'QCL-TypeC' with an SS/PBCH block and, when (QCL-TypeD) is applicable, 'QCL-TypeD' with a periodic CSI-RS resource in a higher layer parameter NZPCSI-RS-ResourceSet configured with higher layer parameter repetition, For a CSI-RS resource in the higher layer parameter NZP-CSI-RS-ResourceSet configured with the higher layer parameter trs-Info and without the higher layer parameter repetition, the UE should assume that a TCI state indicates one of the following QCL type(s):

'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with the same CSI-RS resource, or 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with an SS/PBCH, or 'QCL-TypeA' with a CSI-RS resource in the higher layer parameter NZP-CSI-RS-ResourceSet configured with the higher layer parameter trs-Info and, when (QCL-TyepD is) applicable, 'QCL-TypeD' with a periodic CSI-RS resource in the higher layer parameter NZP-CSI-RS-ResourceSet configured with the higher layer parameter repetition, or 'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when (13 QCL-TypeD) is applicable, 'QCL-TypeD' with the same CSI-RS resource, or 'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with higher layer parameter repetition, or 'QCL-TypeC' with an SS/PBCH block and, when (QCL-TypeD) is applicable, 'QCL-TypeD' with the same SS/PBCH block.

For the DM-RS of PDCCH, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or 'QCL-TypeA' with a CSI-RS resource in the higher layer parameter NZP-CSI-RS-ResourceSet configured without higher layer parameter trs-Info and without the higher layer parameter repetition and, when (QCL-TypeD) is applicable, 'QCL-TypeD' with the same CSI-RS resource.

For the DM-RS of the PDSCH, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

2. Proposed Embodiment

Hereinafter, a configuration proposed in the present disclosure will be described in detail based on the above technical idea and scope.

In the following description, T/F resources may refer to time and/or frequency resources.

In the following description, a case in which T/F resources of respective PDSCHs (e.g., PDSCH #0 and PDSCH #1) transmitted in different transmission and reception points (TRPs) (or beams or panels) overlap is assumed. In this case, the case in which the T/F resources overlap may include all 5 cases illustrated in FIG. 14. In addition, according to embodiments in the following description, the "TRP" may be extensively interpreted as a "beam" or a "signal (spatial) resource".

Figure 14:
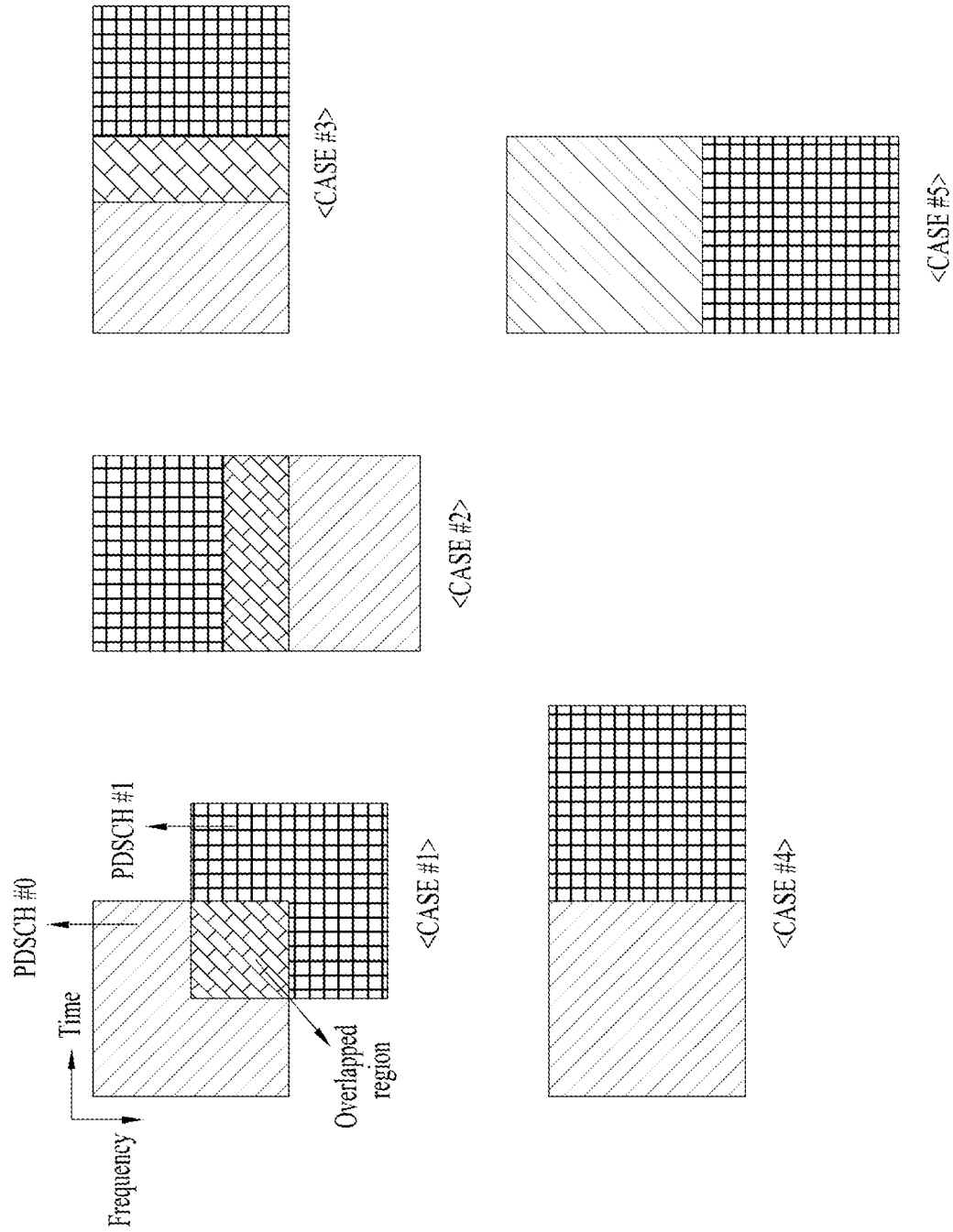
FIG. 14 is a diagram illustrating cases in which two PDSCHs overlap on time and/or frequency resources, which are applicable to the present disclosure.

FIG. 14 is a diagram illustrating cases in which two PDSCHs overlap on time and/or frequency resources, which are applicable to the present disclosure.

As illustrated in FIG. 14, two PDSCHs may partially overlap (e.g., Case #1 to Case #3) or may overlap in one of the time domain or frequency domain of two PDSCHs (e.g., Case #4 and Case #5). In Cases #1, #2, and #3 of FIG. 14, two PDSCHs (partially) overlap in both time and frequency. In Case #4 of FIG. 14, two PDSCHs do not overlap only on the time axis. In Case #5 of FIG. 14, two PDSCHs overlap in the time axis but do not overlap in the frequency axis.

In the following description, when PDSCHs transmitted respectively in different TRPs (or beams) (partially) overlap on time-axis resources (e.g., Case #5) or (partially) overlap on time-axis and frequency-axes resources (e.g., case #1, #2, #3), transmission of the two PDSCHs is referred to as non-coherent joint transmission (NC-JT).

In the following description, NC-JT based on single DCI (hereinafter referred to as single-DCI based NC-JT, for convenience of description) means that PDSCHs transmitted respectively in different TRPs (or beams) are scheduled by one DCI. For example, single-DCI based NC-JT may include a configuration in which DCI #1 simultaneously schedules PDSCHs #1 and #2 for different TRPs.

In the following description, NC-JT based on multiple DCIs (hereinafter referred to as multi-DCI based NC-JT, for convenience of description) means that PDSCHs transmitted respectively in different TRPs (or beams) are scheduled by respective DCIs. For example, multi-DCI based NC-JT may include a configuration in which DCIs #1 and #2 simultaneously schedule PDSCHs #1 and #2.

In the present disclosure, NC-JT may be classified into two cases depending on whether layers transmitted by different TRPs are independent or common.

For example, if layers are independent and if TRP #A transmits 3 layers and TRP #B transmits 4 layers, the UE may expect that a total of 7 layers is transmitted. If layers are common and if TRP #A transmits 3 layers and TRP #B transmits 3 layers, the UE may expect that a total of 3 layers is transmitted.

To distinguish between the two cases, NC-JT of the former may be referred to as NC-JT with independent layer (IL) and NC-JT of the latter may be referred to as NC-JT with common layer (CL).

Although technical configurations proposed in the present disclosure are basically based on NC-JT with IL, the configurations of the present disclosure are not limited thereto and may be extended to NC-JT with CL.

Hereinafter, a signaling method which is applicable when an NC-JT situation is configured for a specific UE will be described in detail.

If a BS schedules different PDSCHs on (partially or fully) overlapping T/F resources using two DCIs for a specific UE, this may be similar to the case in which the specific UE is multiplexed with another UE. This is because a PDSCH scheduled by one DCI acts as interference with a PDSCH scheduled by another DCI (or vice versa).

Accordingly, the UE may design reception filters or differently define reception beams so as to minimize interference between different PDSCHs (e.g., the UE may receive two PDSCHs through different reception beams).

However, the UE may miss one of the two DCIs in some cases. In this case, missing of a signal may mean that the UE fails to recognize that the signal itself has been transmitted or the UE fails to normally detect/decode the signal although the UE recognizes that the signal has been transmitted. Accordingly, the UE may not be aware of (i.e., may not recognize) transmission of a PDSCH itself scheduled by the missed DCI. Then, the UE should recognize the presence of the PDSCH scheduled by the missed DCI through blind detection. That is, this may increase the complexity of the UE.

Therefore, even if the UE misses specific DCI, signaling through which the UE can recognize an NC-JT state may be needed. In particular, when the UE may receive the two PDSCHs using two different reception beams, the UE may implement the reception beams to minimize interference between the two PDSCHs through corresponding signaling.

According to the recent 5G NR standard of 3GPP Rel-15, only one reference signal (RS) set is defined for one TCI state, and only one TCI state is defined to be configured for one UE. Based on the above definition, the present disclosure provides a signaling method to cause a specific UE to recognize an NC-JT situation by configuring two or more RS sets for the TCI state or configuring two or more TCI states for the specific UE.

In this case, the UE is provided with two RS sets. However, the UE may have ambiguity as to which RS set provides QCL information (e.g., spatial QCL) of a DMRS associated with a PDSCH scheduled by corresponding DCI. Therefore, in the present disclosure, a signaling method of informing the UE of which RS set should be applied by an explicit or implicit method will be described in detail.

In the present disclosure, the BS may indicate single-DCI or multi-DCI based NC-JT to the UE by defining/configuring a plurality of RS sets for one TCI state. Next, the BS may provide additional information to the UE so that the UE may select an RS set related to QCL information of a PDSCH scheduled by DCI among a plurality of configured RS sets. For example, the BS may provide the additional information to the UE using CW and/or DMRS port related field information of the DCI.

Alternatively, in the present disclosure, the BS may define one RS set for one TCI state and indicate/configure a plurality of TCI states to/for the UE through specific DCI. Through this, the BS may indicate single-DCI or multi-DCI based NC-JT to the UE. In this case, as a method for the UE to select an RS set related to QCL information of a PDSCH scheduled by DCI among a plurality of configured RS sets, the existing method of searching for one RS set from the plural RS sets described above may be applied.

Therefore, in all methods proposed below, if "one TCI state for which two or more RS sets are defined is indicated to the UE" is changed to "two or more TCI states are indicated to the UE through one DCI", then "one RS set is selected from among a plurality of RS sets" may be extended to "one TCI state is selected from among a plurality of TCI states" in all methods.

In all of the following methods, NC-JT may mean NC-JT with IL. However, all configurations proposed in the present disclosure are not limited only to NC-JT with IL and may be extended to NC-JT with CL, coherent joint transmission (C-JT) with IL, and C-JT with CL.

In all of the following methods, at least one of the following signaling methods may be applied as a method of signaling the UE that NC-JT is applied/configured. However, the following examples are only examples applicable to the present disclosure and a configuration proposed in all the following methods may be equally applied even to other signaling methods of signaling that NC-JT is applied/configured other than the following examples.

(1) The BS may signal the UE that single-DCI or multi-DCI based NC-JT is applied/configured by defining a plurality of RS sets for one TCI state.

(2) The BS may signal the UE that single-DCI or multi-DCI based NC-JT is applied/configured by defining one RS set for one TCI set and indicating a plurality of TCI states to the UE through single DCI.

(3) A radio network temporary identifier (RNTI) and a cell-RNTI (C-RNTI) for NC-JT may be differently defined. Then, the BS may signal the UE that NC-JT is applied/configured by transmitting scrambled DCI to the UE using the RNTI for NC-JT rather than the C-RNTI. Then, if the UE successfully decodes received DCI using the RNTI for NC-JT, the UE may recognize that the BS has indicated NC-JT to the UE.

Hereinbelow, in all methods, DCI(s) paired with NC-JT may mean that respective PDSCHs scheduled by the DCI(s) (partially) overlap on T/F resources.

2.1. Method 1

When two or more RS sets for one TCI state are defined by the BS, the UE may recognize that an NC-JT mode/state is configured/defined with respect thereto. In this case, each RS set may include QCL information (e.g., spatial QCL) for a DMRS of a PDSCH corresponding thereto.

For example, it is assumed that the BS transmits a signal to a specific UE through different TRPs based on the NC-JT mode/state. To this end, the BS may signal, using two DCIs, the specific UE that the NC-JT mode/state is configured.

In this case, when the specific UE has successfully decoded one DCI, the specific UE may be aware of not only spatial QCL information of a DMRS associated with a PDSCH scheduled by the successfully decoded DCI but also spatial QCL information of a DMRS associated with a PDSCH scheduled by the other DCI, regardless of whether the other DCI has been successfully decoded. This is because the specific UE may obtain spatial QCL information of DMRSs associated with respective PDSCHs through a plurality of RS sets in the successfully decoded DCI.

Accordingly, when the specific UE may receive the two PDSCHs using two different reception beams, the specific UE may implement reception beams capable of minimizing interference between the two PDSCHs even if the UE has successfully decoded only one DCI.

2.2. Method 2

When the BS indicates one TCI state for which two or more RS sets are defined to the UE, the UE may expect information indicating which RS set of the plural RS sets is related to a PDSCH (or a DMRS associated with the PDSCH) scheduled by corresponding DCI. For example, in the above case, the UE may expect that information indicating which RS set of the plural RS sets is related to QCL information applied to the PDSCH (or the DMRS associated with the PDSCH) scheduled by the corresponding DCI is received from the BS. In this case, the information may be transmitted and received based on higher layer signaling (e.g., RRC, a media access control (MAC) control element (CE), and/or DCI).

As an example, when two RS sets are defined for one TCI state, it is assumed that the BS indicates the following TCI state to the UE.

TCI state #0={RS set #A, RS set #B}

In this case, when the BS transmits DCI indicating RS set #B to the UE, the UE may assume that QCL information derived from RS set #B is applied to a DMRS associated with a PDSCH scheduled by the DCI.

2.3. Method 3

When the BS indicates one TCI state for which two or more RS sets are defined to the UE, the UE may expect that (without explicit signaling) QCL information derived from an RS set defined at a specific position (e.g., the leftmost (or first) or rightmost (or last) position) among the plural RS sets is applied to a DMRS associated with a PDSCH scheduled by corresponding DCI.

For example, the BS may indicate/configure two TCI states to/for the UE through higher layer signaling (e.g., RRC) as follows.

TCI state #0={RS set #A, RS set #B}, TCI state #1={RS set #B, RS set #A}

Although combinations of RS sets defined for the two TCI states are the same, orders of the RS sets are different. Accordingly, it is assumed that the UE expects that the QCL information derived from an RS set defined at the leftmost (or first) position among the plural RS sets is applied to the DMRS associated with the PDSCH scheduled by the DCI. In this case, when first DCI indicates TCI state #0, the UE may expect/assume that QCL information of a DMRS associated with a PDSCH scheduled by the first DCI is derived from RS set #A. In addition, when second DCI indicates TCI state #1, the UE may expect/assume that QCL information of a DMRS associated with a PDSCH scheduled by the second DCI is derived from RS set #B.

Alternatively, the above-described configuration may be extended as follows. For example, the BS may define a field indicating an RS set related to the QCL information to the UE with respect to an RS set as follows. For example, the BS may indicate/configure the following TCI state to/for the UE.

TCI state #0={RS set #A, 1, RS set #B, 0}, TCI state #1={RS set #A, 0, RS set #B, 1}

That is, the BS may define a 1-bit bitmap for each RS set and indicate an RS set associated with QCL information of a DMRS associated with a PDSCH scheduled by corresponding DCI using the bitmap (e.g., an RS set indicated by 1). As an example, when the BS indicates/configures TCI state #0 to/for the UE, the UE may assume that QCL information derived by RS set #A is applied to the DMRS associated with the PDSCH scheduled by the DCI.

According to this method, the BS may provide related information to the UE without explicit signaling (e.g., an additional DCI field).

2.4. Method 4

When the BS indicates/configures one TCI state for which two or more RS sets are defined to/for the UE, the BS may provide information about an RS set associated with a DMRS related to a PDSCH scheduled by DCI based on an enabled CW among two CWs configured by the DCI.

In the NR system to which the present disclosure is applicable, the BS and the UE may transmit and receive signals using up to two CWs. To this end, the DCI transmitted by the BS to the UE may include an NDI/MCS/RV field for each CW.

Meanwhile, when two different TRPs transmit respective PDSCHs to one UE through (partially) overlapping T/F resources, there is a high possibility that reception powers for the different TRPs are different in terms of the UE. In consideration of this possibility, when two CWs are configured/defined, it may be desirable that the CWs be configured/defined for the respective TRPs. That is, the TRPs may be mapped to CWs 1:1.

More specifically, when the BS sets a higher layer parameter value maxNrofCodeWordsScheduledByDCI to 2 (or n2) for the UE, the UE may assume that a maximum of two CWs is present. In this case, when the MCS and RV field values for a specific TB (or corresponding CW) in DCI received from the BS are set to 26 and 1, respectively, the UE may disable the specific TB (or corresponding CW). If initial transmission includes two CWs and retransmission includes one CW (i.e., decreased from two CWs to one CW), the BS may signal the UE which TB (or corresponding CW) has been retransmitted through the above signaling method.

Similarly, when respective RS sets are mapped to the CWs 1:1, the same scheme may be applied.

More specifically, the UE may assume that CW #1 and CW #2 are mapped to RS set #A and RS set #B, respectively.

In this case, if CWs #1 and #2 of the DCI are disabled and enabled, respectively, the UE may derive QCL information of the DMRS associated with the PDSCH scheduled by the DCI from RS set #B. In other words, the UE may obtain the QCL information of the DMRS associated with the PDSCH scheduled by the DCI based on RS set #B.

In contrast, when CWs #1 and #2 of the DCI are enabled and disabled, respectively, the UE may derive QCL information of the DMRS associated with the PDSCH scheduled by the DCI from RS set #A. In other words, the UE may obtain the QCL information of the DMRS associated with the PDSCH scheduled by the DCI based on RS set #A.

In the above example, when two RS sets are configured/defined for one TCI state while only one CW is enabled, the UE may recognize that an NC-JT state/mode is applied through multiple DCIs through corresponding signaling.

According to such a method, an additional DCI field does not need to be newly defined. In other words, the method may be equally applied to the existing NR system.

When the NC-JT state/mode is used, even if one DCI based on the above method schedules only one CW, fields for two CWs should always be configured/defined in the DCI. Then, bits (e.g., 8 bits) of a predetermined size for an unused CW may be wasted.

In consideration of this situation, in a modification applicable to the present disclosure, the BS may configure only one CW and additionally configure/define a 1-bit DCI field additionally indicating an RS set related to the one CW, instead of bits of a predetermined size for the unused CW. From this point of view, in a non-NC-JT state/mode, the above-described signaling method may be limitedly applied only when the PDSCH scheduled by one DCI supports two CWs.

Additionally, when the higher layer parameter maxNrofCodeWordsScheduledByDCI is set to 1, the BS may additionally configure/define a DCI field for selecting/indicating one of a plurality of RS sets defined for a TCI state as in Method 2 described above. On the other hand, when the higher layer parameter maxNrofCodeWordsScheduledByDCI is set to 2, the BS may select/indicate one of the plural RS sets defined for the TCI state, using signaling indicating whether a CW is enabled/disabled, instead of the additional DCI field, as in Method 4 described above.

2.5. Method 5

When the BS configures one TCI state for which two RS sets are defined for the UE and all of two CWs configured by DCI are enabled, the UE may expect that a single-DCI based NC-JT mode/state is configured. On the contrary, when the BS configures one TCI state for which two RS sets are defined for the UE and only one of two CWs configured by the DCI is enabled, the UE may expect that a multi-DCI based NC-JT mode/state is configured.

In the above-described single-DCI based NC-JT mode/state, the BS may schedule respective PDSCHs transmitted in plural TRPs through one DCI. Therefore, unlike the multi-DCI based NC-JT mode/state, the case in which the UE misses one of a plurality of DCIs scheduling the PDSCH on (partially) overlapping T/F resources does not occur in the single-DCI based NC-JT mode/state.

More specifically, the UE according to the present disclosure may expect/assume that CWs #1 and #2 (or CWs #0 and #1) are mapped to RS sets #A and/#B, respectively. Alternatively, the UE may expect/assume that CWs #1 and #2 (or CWs #0 and #1) are mapped to RS sets #B and #A, respectively.

When the BS indicates/configures one TCI state for which a plurality of RS sets is defined to/for the UE and the number of CWs enabled by DCI transmitted by the BS to the UE is 2, the UE may derive QCL information of DMRSs of respective PDSCHs including CWs #1 and #2 (or CWs #0 and #1) from RS sets #A and #B (single-DCI based NC-JT).

Alternatively, when the BS indicates/configures one TCI state for which a plurality of RS sets is defined to/for the UE and only one CW is enabled (e.g., when CWs #1 and #2 (or CWs #0 and #1) are enabled and disabled, respectively) by the DCI transmitted by the BS to the UE, the UE may derive QCL information of a DMRS of a PDSCH scheduled by the DCI from RS set #A (multi-DCI based NC-JT).

Alternatively, when the BS indicates/configures one TCI state for which a plurality of RS sets is defined to/for the UE and only one CW is enabled by the DCI transmitted by the BS to the UE (e.g., when CWs #1 and #2 (or CWs #0 and #1) are disabled and enabled, respectively), the UE may derive QCL information of a DMRS of a PDSCH scheduled by the DCI from RS set #B (multi-DCI based NC-JT).

2.6. Method 6

Hereinbelow, it is assumed that the BS indicates/configures one TCI state for which a plurality of RS sets is defined to/for the UE and only one of two configured CWs is enabled by DCI transmitted by the BS to the UE. In this case, if the UE fails to receive another DCI before the UE receives a PDSCH scheduled by the DCI or within a time window (or timer) after the DCI is received, the UE may report occurrence of NACK for the PDSCH scheduled by the DCI to the BS.

In Methods 1 to 5 described above, the following assumption is made: if the BS indicates/configures one TCI state for which a plurality of RS sets is defined to/for the UE and only one of two configured CWs is enabled by DCI transmitted by the BS to the UE, the UE may assume that a fist PDSCH scheduled by the DCI and a second PDSCH scheduled by another DCI are configured to (partially) overlap on T/F resources. In this case, if the UE fails to receive the other DCI, this may mean that the UE has failed to perform DCI decoding although the BS has transmitted the other DCI to the UE. Therefore, in this case, the UE may report NACK for a PDSCH scheduled by the DCI that the UE has fails to decode the BS.

Meanwhile, when the UE misses one of the two DCIs, the UE may also miss a PUCCH resource scheduled by the missed DCI. Then, the BS may have ambiguity about (1) whether the UE has missed DCI (by doing so, whether the UE has not performed ACK/NACK report) or (2) whether the BS has failed to decode ACK/NACK report although the UE has performed the ACK/NACK report.

However, according to a method proposed in the present disclosure, if the UE succeeds in decoding only one of the two DCIs, the UE may simultaneously report ACK/NACK signals for the two DCIs. Accordingly, in the above case, the BS may exclude at least the case in which the BS has failed to decode a PUCCH for ACK/NACK from the cases in which ACK/NACK report has not been received, on the grounds that the UE may perform ACK/NACK report even for missed DCI.

In the present disclosure, when the BS configures/indicates one TCI state for which two or more RS sets are defined to/for the UE, the UE may assume/expect that PDSCHs scheduled by different DCIs are present on the same T/F resource. Accordingly, the UE may expect that the other DCI is transmitted before a time point at which the UE receives a PDSCH scheduled by received DCI.

Meanwhile, upon considering a time delay for DCI decoding, a predetermined time or more may be secured between a time point at which the other DCI is transmitted and a time point at which the PDSCH is received. Accordingly, when the other DCI is not received before a specific time based on a PDSCH reception time, the UE may report NACK for the PDSCH scheduled by the other DCI under the assumption that decoding for the other DCI has failed. Meanwhile, information about the predetermined time may be configured for the UE through higher layer (e.g., RRC) signaling.

2.7. Method 7

It is assumed that the BS configures/indicates one TCI state for which two or more RS sets are defined for/to the UE and only one of two CWs is enabled by DCI. In this case, the UE may expect that ACK/NACK signals for respective PDSCHs scheduled by DCI and another DCI paired with the DCI are multiplexed and transmitted on the same PUCCH resource.

More specifically, the UE may multiplex and transmit ACK/NACK for a PDSCH scheduled by the missed DCI according to Method 6 through a PUCCH resource indicated by DCI that has successfully been decoded.

To this end, the two DCIs should be configured to have the same PUCCH resource and the same transmission timing. Accordingly, when the UE succeeds in decoding only one of the two DCIs, the UE may simultaneously report ACK/NACK signals for the two DCIs to the BS.

In the above method, the UE may assume that up to one CW is scheduled by one DCI. Accordingly, when 2 bits are allocated for the PUCCH resource, the UE may simultaneously transmit ACK/NACK signals for two DCIs on the PUCCH resource.

As a modified example, the UE may expect that the most significant bit (MSB) and least significant bit (LSB) of ACK/NACK-related bit information are sequentially mapped one-to-one to CWs or RS sets, respectively.

More specifically, when the UE multiplexes and transmits ACK/NACK signals for two DCIs, a rule for interpreting the multiplexed ACK/NACK information (e.g., 2-bit information) transmitted by the UE between the UE and the BS may be defined. In this case, considering that CWs #1 and #2 (or CWs #0 and #1) are mapped 1:1 to the RS sets defined for the TCI state, the MSB and the LSB of the ACK/NACK information (e.g., 2-bit information) may correspond to or may be mapped to ACK/NACK signals of a first CW and a second CW, respectively.

As another modified example, only when the BS configures/defines 8 or less PUCCH resources in the first PUCCH resource set (e.g., PUCCH resource set #1) among a plurality of PUCCH resource sets configured for the UE, the UE may expect that ACK/NACK signals for PDSCHs scheduled by two DCIs are multiplexed and transmitted on the same PUCCH resource as in Method 7 described above.

More specifically, in the NR system to which the present disclosure is applicable, a PUCCH resource for ACK/NACK reporting related to a PDSCH may be determined based on RRC or DCI (e.g., ACK/NACK resource indicator (ARI) of DCI and/or an implicit control channel element (CCE) mapping of the DCI). In this case, when 8 or less PUCCH resources in the PUCCH resource set #1 are configured/defined, the BS and the UE may determine a PUCCH based only on the ARI of the DCI. In other words, irrespective of CCE mapping of the DCI, the BS may indicate the same PUCCH resource (for ACK/NACK) as PUCCH resources associated with PDSCHs scheduled by the two DCIs.

Alternatively, even when more than 8 or more PUCCH resources in the first PUCCH resource set (e.g., PUCCH resource set #1) are configured/defined among a plurality of PUCCH resource sets configured by the BS for the UE, the BS may configure the PUCCH resources associated with the PDSCHs scheduled by the two DCIs to be equal by controlling CCE mapping of the two DCIs. In this case, the UE may still expect that ACK/NACK signals for respective PDSCHs scheduled by the two DCIs are multiplexed and transmitted on the same PUCCH resource.

In the NR system to which the present disclosure is applicable, up to 32 PUCCH resources may be configured in the first PUCCH resource set (e.g., PUCCH resource set #1) and the PUCCH resource set may include 8 subsets each including 4 PUCCH resources. In this case, the ARI field of DCI indicates one of the 8 subsets and one PUCCH resource in a subset selected based on implicit CCE mapping of the DCI may be selected/determined. In consideration of such characteristics, the following method may be considered such that the same PUCCH resource is allocated to the PDSCHs scheduled by the two DCIs.

If two or more RS sets are configured for one TCI state and a multi-DCI based NC-JT mode/state is configured for the UE, the UE may be configured/implemented to select a PUCCH resource having a low index/ID from among PUCCH resources included in a PUCCH subset (in PUCCH resource set #1) determined based on the ARI in the DCI. In this case, even when the number of PUCCH resources included in PUCCH resource set #1 is greater than 8, the UE may expect that ACK/NACK signals for the PDSCHs scheduled by two DCIs are multiplexed and transmitted on the same PUCCH resource as in Method 7 regardless of implicit CCE mapping of the DCIs.

On the other hand, as described above, the PUCCH resource configured to multiplex ACK/NACK reports for the PDSCHs scheduled by the two DCIs needs to be set to always have a size greater than 2 bits. Accordingly, the UE may be configured/implemented to select a PUCCH resource having a low index/ID among PUCCH resources satisfying a size of 2 bits in a PUCCH subset (in PUCCH resource set #1) determined based on the ARI in the DCI. The above method is advantageous in that the UE becomes free from restrictions on a condition that the PUCCH resource having the lowest index/ID in a selected PUCCH resource subset should always have a 2-bit size.

On the other hand, if the size of the PUCCH resource for the PDSCHs scheduled by two DCI is greater than 2 bits, the PUCCH resource is included in a PUCCH resource set other than the first PUCCH resource set (e.g., PUCCH resource set #1) (according to definition of the NR system). In the NR system, the PUCCH resource set other than the first PUCCH resource set is configured to include a maximum of 8 PUCCH resources. Thus, when the size of the PUCCH resource for the PDSCHs scheduled by two DCIs is greater than 2 bits, the BS may allocate/configure the same PUCCH resource for the two DCIs (or related PUSCHs) using the ARI field in the DCI.

In the above-described configuration, a PUCCH resource selected for ACK/NACK multiplexing may be a PUCCH resource of an order (e.g., third or fourth PUCCH resource) other than the first PUCCH resource in a specific PUCCH resource set (or subset). To this end, separate signaling (e.g., higher layer signaling (e.g., RRC or a MAC-CE)) may be utilized.

2.8. Method 8

When the BS configures/indicates one TCI state for which two or more RS sets are defined for/to the UE, the UE may select an RS set that provides QCL information of a DMRS of a PDSCH scheduled by the DCI, based on a DMRS port number configured by the DCI or a combination of DMRS port numbers.

2.8.1. Method 8-1

It is assumed that the BS configures/indicates one TCI state for which two or more RS sets are defined for/to the UE and that a DMRS port indicated by DCI is included only in one specific DMRS port group or CDM group. In this case, the UE may select an RS set that provides the QCL information of the PDSCH DMRS scheduled by the DCI, based on information about the DMRS port group or the CDM group.

In the following description, "DMRS port group" may be changed to "CDM group". In other words, all technical features applied to the "DMRS port group" in the following description may be equally applied to the "CDM group".

The following table shows a DMRS port group set (or CDM group set) according to a DMRS type configuration. In a given configuration, one DMRS port group may mean a combination of DMRS ports multiplexed by CDM-F and/or CDM-T. DMRS port groups (or CDM groups) #1/#2/#3/#4/#5/#6 may have a sequentially associated relationship with the RS sets defined for one TCI state in order.

In Table 10, each group may be categorized based on FDM.

TABLE 10

|  | DMRS type configuration = 1 | DMRS type configuration = 2 |
| --- | --- | --- |
| DMRS port group #1 (CDM group #1) | {0, 1, 4, 5} | {0, 1, 6, 7} |
| DMRS port group #2 (CDM group #2) | {2, 3, 6, 7} | {2, 3, 8, 9} |
| DMRS port group #3 (CDM group #3) |  | {4, 5, 10, 11} |

In Table 11, each group may be categorized based on FDM or CDM-T.

TABLE 11

|  | DMRS type configuration = 1 | DMRS type configuration = 2 |
| --- | --- | --- |
| DMRS port group #1 (CDM group #1) | {0, 1} | {0, 1} |
| DMRS port group #2 (CDM group #2) | {2, 3} | {2, 3} |
| DMRS port group #3 (CDM group #3) | {4, 5} | {4, 5} |
| DMRS port group #4 (CDM group #4) | {6, 7} | {6, 7} |
| DMRS port group #5 (CDM group #5) |  | {8, 9} |
| DMRS port group #6 (CDM group #6) |  | {10, 11} |

Hereinbelow, for convenience of description, related configurations will be described based on the configurations of Table 10 unless explicitly stated otherwise for the configurations of Table 10. The configurations may be extended to the configurations of Table 11 without being limited to the configurations of Table 10.

For example, it is assumed that the BS configures TCI state #0={RS set #A, RS set #B} and a higher layer parameter DMRS configuration-Type=1 for the UE. If DMRS port numbers indicated by DCI (that schedules a PDSCH) belong to DMRS port group #1, the UE may assume that QCL information of the DMRS of the PDSCH scheduled by the DCI is derived from RS set #A. Alternatively, when the DMRS port numbers indicated by the DCI belong to DMRS port group #2, the UE may assume that the QCL information of the DMRS of the PDSCH scheduled by the DCI is derived from RS set #B.

As another example, it is assumed that the BS configures a TCI state #0={RS set #A, RS set #B} (or TCI state #0={RS set #A, RS set #B, RS set #C}) and a higher layer parameter DMRS configuration-Type=2 for the UE. If the DMRS port numbers indicated by the DCI (that schedules the PDSCH) belong to DMRS port group #1, the UE may assume that the QCL information of the DMRS of the PDSCH scheduled by the DCI is derived from RS set #A. Alternatively, if the DMRS port numbers indicated by the DCI belong to DMRS port group #2, the UE may assume that the QCL information of the DMRS of the PDSCH scheduled by the DCI is derived from RS set #B. Alternatively, if the DMRS port numbers indicated by the DCI belong to the DMRS port group #3 (only when the TCI state #0={RS set #A, RS set #B, RS set #C}), the UE may assume that QCL information of the DMRS of the PDSCH scheduled by the DCI is derived from the RS set #C.

It is assumed that the BS configures TCI state #0={RS set #A, RS set #B} and the higher layer parameter DMRS configuration-Type=1 for the UE. Next, Table 12 shows DMRS port configuration information when the DMRS configuration type is set to the first DMRS configuration type and the maximum number of OFDM symbols for a DL front-loaded DMRS is set to 2 as shown in Table 7.

Based on the above-described assumptions and the following table, when value=2 (DMRS ports #0 and #1) is allocated for the UE, the UE may assume that the QCL information of the DMRS of the PDSCH scheduled by the DCI is derived from RS set #A. When value=8 (DMRS ports #2 and #3) is allocated to the UE, the UE may assume that the QCL information of the DMRS of the PDSCH scheduled by the DCI is derived from RS set #B.

mode/state. If the BS configures/indicates one TCI state for which two or more RS sets are defined for/to the UE and DMRS ports indicated by the DCI are included only in one specific DMRS port group, the UE may expect a multi-DCI based NC-JT mode/state.

As an example, it is assumed that the BS configures TCI state #0={RS set #A, RS set #B} and the higher layer parameter DMRS configuration-Type=1 for the UE. In this case, when value=9 (DMRS ports #0, #1, and #2) of Table 12 is allocated to the UE, the UE may assume/expect that QCL information of DMRS ports #0 and #1 is derived from RS set #A. In addition, the UE may assume/expect that QCL information of DMRS port #2 is derived from RS set #B. As a result, when a combination of DMRS ports allocated to the UE is configured in the form of a mixture of DMRS

TABLE 12

| | One Codeword:<br>Codeword 0 enabled,<br>Codeword 1 disabled | | | | Two Codewords:<br>Codeword 0 enabled,<br>Codeword 1 enabled | | |
| --- | --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

Methods 8-2, 8-3, and 8-4 described below are based on Methods 5, 6, and 7, respectively, described above. However, Methods 8-2, 8-3, and 8-4 are different from Methods 5, 6, and 7 in that the UE searches for an RS set that provides the QCL information of the DMRS of the PDSCH from a plurality of RS sets defined for one TCI state, based on DMRS port related information, rather than CW related information configured by the DCI.

2.8.2. Method 8-2

If the BS configures/indicates one TCI state for which two or more RS sets are defined for/to the UE and DMRS ports indicated by the DCI belong to a plurality of different DMRS port groups, the UE may expect a single-DCI based NC-JT port group #1 and DMRS port group #2, the UE may interpret corresponding signaling/configuration as the single-DCI based NC-JT mode/state rather than the multi-DCI based NC-JT mode/state.

As another example, it is assumed that the BS configures TCI state #0={RS set #A, RS set #B} and the higher layer parameter DMRS configuration-Type=1 for the UE. It is assumed that the DMRS port group configured for the UE is based on Table 11. If value=28 (DMRS ports #0, #1, #4, and #5) of Table 12 is allocated to the UE, the UE may assume/expect that the QCL information of DMRS ports #0 and #1 is derived from RS set #A. and the QCL information of DMRS ports #4 and #5 is derived from RS set #B. As a result, when a combination of the DMRS ports allocated to the UE is configured in the form of a mixture of DMRS ports belonging to different DMRS port groups, the UE may interpret corresponding signaling/configuration as the single-DCI based NC-JT mode/state rather than the multi-DCI based NC-JT mode/state.

As another example, it is assumed that the BS configures the higher layer parameter maxNrofCodeWordsScheduledByDCI=1 for the UE and TCI state={RS set #A, RS set #B} and DMRS port={#0, #1, #2, #3} are configured/indicated for/to the UE through the DCI.

In this case, since a combination of configured/indicated DMRS ports is a mixture, the UE may interpret corresponding signaling/configuration as the single-DCI based transmission mode/state.

Accordingly, the transmission mode/state supports only a single CW and the UE may expect that PDSCHs transmitted by two TRPs corresponding to RS sets #A and #B are transmitted based on the same MCS. The UE may assume that QCL information of DMRS ports #0 and #1 is derived from RS set #A, and that QCL information of DMRS ports #2 and #3 is derived from RS set #B.

Alternatively, when the BS configures the higher layer parameter maxNrofCodeWordsScheduledByDCI=2 for the UE and disables a specific CW of two CWs through the DCI (i.e., a specific field value in the DCI is configured as a value indicating MCS=26 and RV=1), MCS information configured/indicated for/to the UE is one and the UE may perform the same signal transmission/reception operation as in a single CW.

Alternatively, it is assumed that the BS configures the higher layer parameter maxNrofCodeWordsScheduledByDCI=2 for the UE and enables both CWs through the DCI.

In this case, the UE may expect that PDSCHs transmitted by two TRPs corresponding to RS sets #A and #B are transmitted with different MCSs. For example, the UE may expect that layers #0 and #1 corresponding to DMRS ports #0 and #1 are transmitted based on MCS #0 and layers #2 and #3 corresponding to DMRS ports #2 and #3 are transmitted based on MCS #1. Meanwhile, the UE may assume/expect that QCL information of DMRS ports #0 and #1 is derived from RS set #A and assume/expect that QCL information of DMRS ports #2 and #3 is derived from RS set #B.

2.8.3. Method 8-3

It is assumed that the BS configures/indicates one TCI state for which two or more RS sets are defined for/to the UE and an indicated DMRS port belongs to only one DMRS port group. In this case, if the UE fails to receive another DCI before the UE receives a PDSCH scheduled by DCI or within a time window (or timer) of a predetermined size after the DCI is received, the UE may report occurrence of NACK for the PDSCH scheduled by the DCI to the BS.

2.8.4. Method 8-4

It is assumed that the BS configures/indicates one TCI state for which two or more RS sets are defined for/to the UE and an indicated DMRS port belongs to only one DMRS port group. In this case, the UE may expect that ACK/NACK signals for respective PDSCHs scheduled by the DCI and another DCI paired with the DCI are multiplexed and transmitted on the same PUCCH resource.

Additionally, when the BS configures the higher layer parameter maxNrofCodeWordsScheduledByDCI=1 for the UE, the UE may expect a 1-bit PUCCH resource for ACK/NACK. However, even if the bit size value is set to 1, when an NC-JT mode/state is configured/indicated for/to the UE according to the above-described various methods, the UE may expect/assume that a 2-bit PUCCH resource for ACK/NACK is configured (in spite of configuration for the above bit size value).

2.9. Method 9

According to the method, the BS may separately define an RNTI for NC-JT. Accordingly, when the BS scrambles and transmits a cyclic redundancy check (CRC) of DCI using the RNTI for NC-JT, if the CRC of received DCI is resolved (or if decoding is successful) by the RNTI for NC-JT, the UE may interpret the DCI as DCI used for NC-JT.

2.10. Method 10

The BS may configure TCI states for NC-JT, which are distinguished from TCI states for non-CoMP, through a higher layer parameter (e.g., RRC and/or MAC-CE) for the UE. In addition, when the UE successfully decodes DCI using the RNTI for NC-JT, the UE may receive one of the configured TCI states for NC-JT through a TCI indication field in the DCI.

According to the above method, the BS may inform the UE of an NC-JT state/mode based on the RNTI for NC-JT. Then, the UE may expect/assume a TCI state for which two or more RS sets are defined. Therefore, according to the above method, Methods 1 to 8 described above may be applied (without further modification).

More specifically, according to the standard document of 3GPP TS 38.321 in which the NR system to which the present disclosure is applicable is defined (e.g., FIG. 6.1.3.14-1), a bitmap for each of (N-2) x8 TCI states may be defined. If the bit (or field) of a corresponding TCI state is defined as 0 or 1, this may mean that the TCI state is deactivated or activated. Activated TCI states may be mapped 1:1 to DCI codepoints in order of TCI state IDs. For example, when field values of TCI state #0 to #7 are set to [0 1 1 0 0 0 1 1], a mapping relationship between DCI codepoints and TCI states may be configured as shown in the following table.

TABLE 13

| Codepoint | TCI state |
| --- | --- |
| 00 | #1 |
| 01 | #2 |
| 10 | #6 |
| 11 | #7 |

Alternatively, the BS may configure TCI states for non-CoMP and TCI states for NC-JT for the UE through a higher layer parameter (e.g., RRC). In this case, 1-bit information (e.g., 0 or 1) existing next to each RS set may indicate whether a corresponding TCI-state is activated or deactivated.

(1) TCI states for Non-CoMP
TCI state #1={RS set #A}, 1
TCI state #2={RS set #B}, 1
TCI state #3={RS set #C}, 0
TCI state #4={RS set #D}, 0
TCI state #6={RS set #E}, 1
TCI state #7={RS set #F}, 1
(2) TCI states for CoMP
TCI state #8={RS set #A, RS set #B}, 0
TCI state #9={RS set #B, RS set #C}, 1
TCI state #10={RS set #C, RS set #A}, 1

TCI state #11={RS set #D, RS set #C}, 1
TCI state #12={RS set #D, RS set #E}, 0
TCI state #13={RS set #C, RS set #F}, 1

Additionally, according to the present disclosure, two tables may be defined as shown below. In this case, if the UE successfully decodes DCI based on a cell-RNTI (C-RNTI), the UE may expect/assume that the TCI field of the DCI indicates one of TCI states for non-CoMP.

Next, if the UE succeeds in decoding the DCI based on the RNTI for NC-JT, the UE may expect/assume that the TCI field of the DCI indicates one of TCI states for CoMP.

In the present disclosure, although it has been assumed that the size of the TCI field is 2 bits, the size of the TCI field may be extended to a bit size other than 2 bits.

Tables 14 and 15 below show examples of tables applicable to TCI states for non-CoMP and TCI states for CoMP, respectively.

TABLE 14

| Codepoint | TCI state |
|---|---|
| 00 | #1 |
| 01 | #2 |
| 10 | #6 |
| 11 | #7 |

TABLE 15

| Codepoint | TCI state |
|---|---|
| 00 | #9 |
| 01 | #10 |
| 10 | #11 |
| 11 | #13 |

As another example, when the UE succeeds in decoding DCI based on the RNTI for NC-JT, the UE may expect/assume that another DCI scrambled by the RNTI for NC-JT is transmitted. However, when the UE fails to receive the other DCI before the UE receives a PDSCH scheduled by the DCI that the UE has successfully decoded or within a time window (or timer) of a predetermined size after the DCI that the UE has successfully decoded is received, the UE may report occurrence of NACK for a PDSCH scheduled by the other DCI to the BS. In Method 6 described earlier, if the UE misses one of two DCIs paired in the NC-JT mode/state, an operation condition of the UE related to ACK/NACK may be appreciated as a limited configuration based on the RNTI for NC-JT in this method.

As another example, when the UE succeeds in decoding DCI based on the RNTI for NC-JT, the UE may expect/assume that another DCI scrambled by the RNTI for NC-JT is transmitted. In this case, the UE may expect/assume that ACK/NACK signals for respective PDSCHs scheduled by the two DCIs are multiplexed and transmitted on the same PUSCH resource. In Method 7 described above, the operation condition of the UE in which the ACK/NACK signals for respective PDSCHs scheduled by the two DCIs are multiplexed and transmitted on the same PUSCH resource may be understood as a limited configuration based on the RNTI for NC-JT in this method.

2.11. Method 11

When the BS configures/indicates an NC-JT mode/state for/to the UE, the UE may expect/assume a 2-bit PUCCH resource for ACK/NACK regardless of a configuration value of the higher layer parameter maxNrofCodeWordsScheduledByDCI.

In Methods 6 and 7 described above, even if the UE misses one of the DCIs paired in NC-JT, the UE may be configured to transmit NACK for the PDSCH scheduled by the missed DCI.

However, in the recent specification of the NR system to which the present disclosure is applicable, when the BS configures the higher layer parameter maxNrofCodeWordsScheduledByDCI=1 for the UE, the UE may expect/assume a 1-bit PUCCH resource for ACK/NACK. In this case, Methods 6 and 7 described above may not be satisfied. Accordingly, even if the BS configures the higher layer parameter maxNrofCodeWordsScheduledByDCI=1 for the UE according to the present method, when the NC-JT mode/status is indicated to the UE, the UE may expect/assume a 2-bit PUCCH resource for ACK/NACK.

As a modified example, when a plurality of ACK/NACK PUCCH resources for respective PDSCHs scheduled by the DCIs paired in the NC-JT mode/state is configured/allocated in the same slot according to the above method, the UE may transmit ACK/NACK information by arbitrarily selecting one of the PUCCH resources.

More specifically, according to Method 7 described above, the BS allocates the same PUCCH resource of the same slot timing with respect to all PDSCHs scheduled by the DCIs paired in the NC-JT mode/state and then the UE in the NC-JT mode/state may expect/assume a PUCCH resource for one ACK/NACK report. In this case, there may be an advantage that PUCCH resources can be efficiently managed. However, for this purpose, dynamic coordination between TRPs or cells should be basically provided. If not, the BS may configure/indicate different PUCCH resources of different slot timings through respective DCIs for/to the UE.

Meanwhile, according to Method 11 described above, when the BS configures/indicates different PUCCH resources #0 and #1 of the same slot timing through two DCIs paired in the NC-JT mode/state, the UE according to the modified example may transmit ACK/NACK through a corresponding PUCCH resource by randomly selecting one of the two PUCCH resources. This is because the two PUCCH resources are used to transmit the same information so that there is no need to multiplex the two PUCCH resources.

Meanwhile, the UE may transmit ACK/NACK information by selecting a PUCCH resource indicated/allocated by DCI that schedules a PDSCH having a QCL relationship with RS set #A located in the foremost position (or rearmost position) from TCI state={RS set #A, RS set #B}, rather than randomly selecting one of the two PUCCH resources.

Figure 15A:
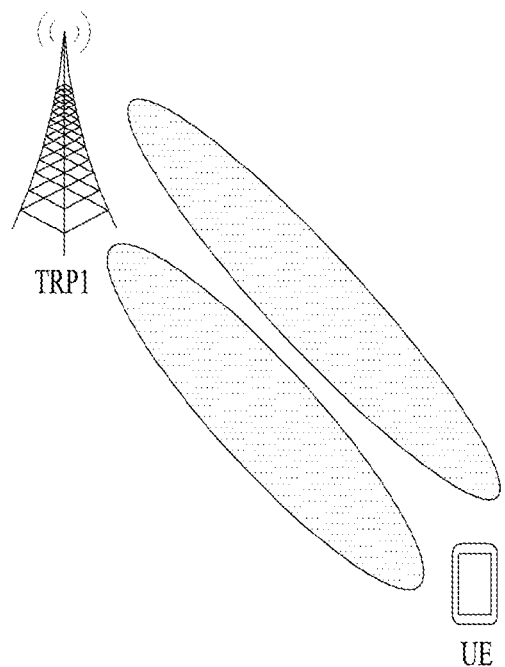
FIGS. 15A and 15B are diagrams illustrating a signal transmission and reception operation between a UE and a BS (or a network) applicable to the present disclosure.
Figure 15B:
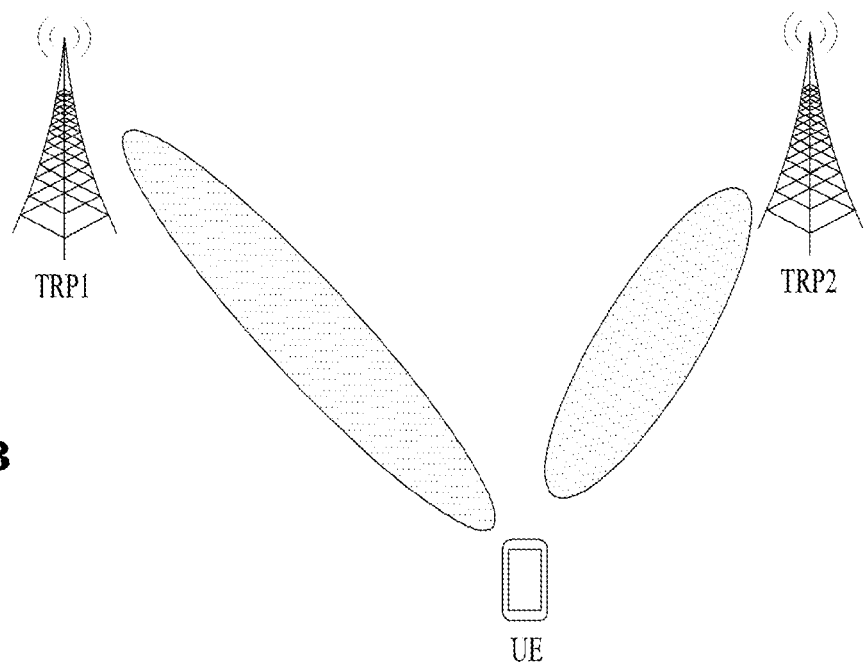

FIGS. 15A and 15B are diagrams illustrating a signal transmission and reception operation between a UE and a BS (or a network) applicable to the present disclosure.

As illustrated in FIG. 15A, the UE and the BS (or network) may simultaneously transmit and receive a plurality of data (e.g., PDSCHs) through one TRP. To this end, the BS may transmit a plurality of DCIs to the UE and transmit a plurality of PDSCHs related to the DCIs through the one TRP.

Alternatively, as illustrated in FIG. 15B, the UE and the BS may simultaneously transmit and receive a plurality of data (e.g., PDSCHs) through a plurality of TRPs. To this end, the BS may transmit a plurality of DCIs to the UE and may transmit a plurality of PDSCHs related to the DCIs through the TRPs, respectively.

Hereinafter, a signal transmission and reception method between the UE and the BS applicable to all the above-described signal transmission/reception operations will be described in detail.

Figure 16:
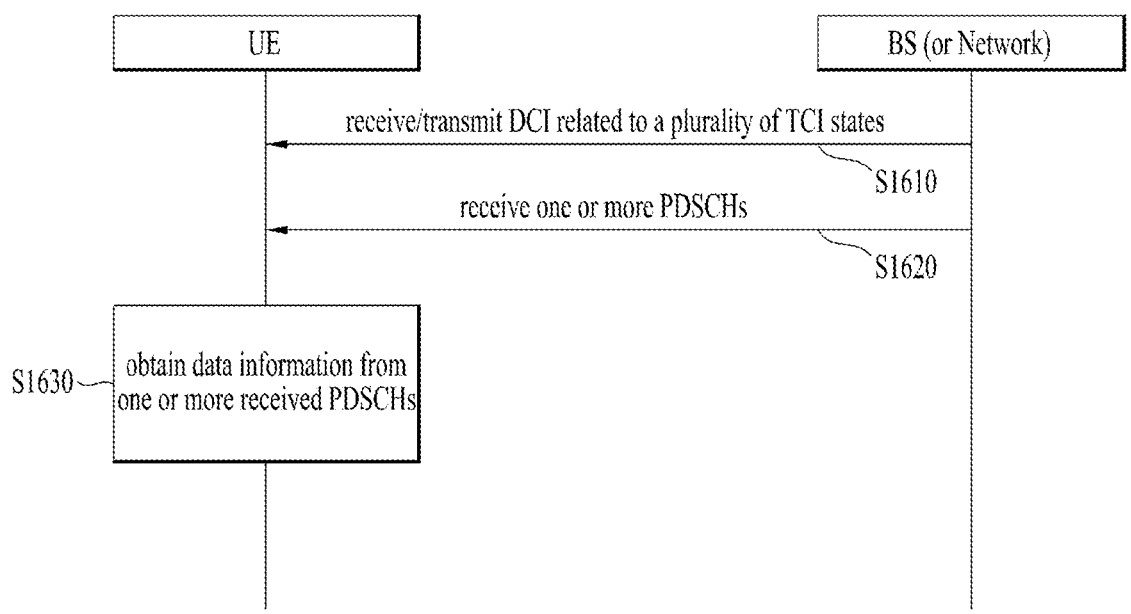
FIG. 16 is a diagram illustrating operations of a UE and a BS applicable to the present disclosure.
Figure 17:
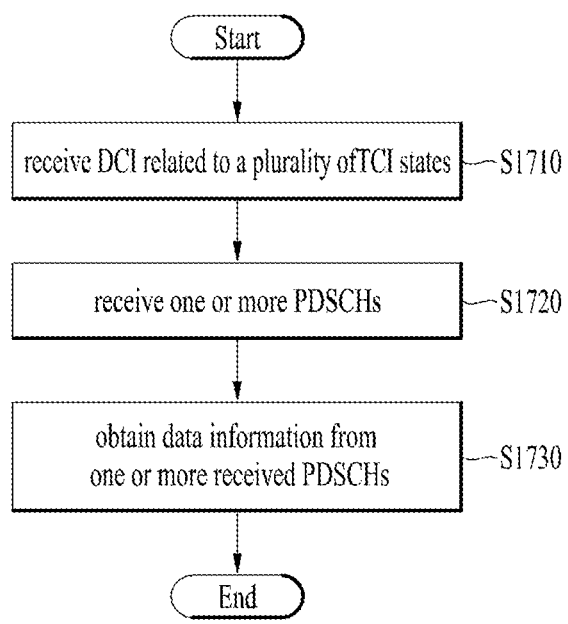
FIG. 17 is a flowchart illustrating an operation of a UE according to the present disclosure.
Figure 18:
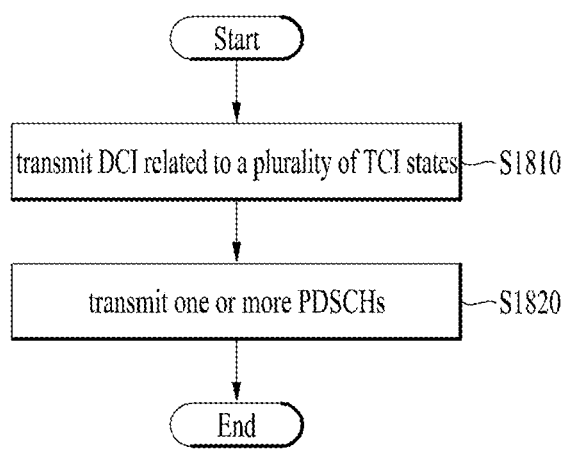
FIG. 18 is a flowchart illustrating an operation of a BS according to the present disclosure.

FIG. 16 is a diagram illustrating operations of a UE and a BS applicable to the present disclosure. FIG. 17 is a flowchart illustrating an operation of a UE according to the present disclosure. FIG. 18 is a flowchart illustrating an operation of a BS according to the present disclosure.

The UE receives DCI related to a plurality of TCI states from the BS (or network) (S1610 and S1710). The BS transmits DCI related to the plurality of TCI states to the UE (S1610 and S1810).

Herein, if the plurality of TCI states are related to the DCI, this may mean that the plurality of TCI states related to one RS set are allocated to the UE by the DCI. In other words, when plurality of TCI states (related to one RS set) are allocated to the UE by the DCI, this may mean that the DCI is related to the plurality of TCI states.

In this case, the UE may assume that a second PDSCH scheduled for the UE is present so as to overlap with a first PDSCH scheduled by the DCI on a time resource, based on the plurality of TCI states related to one reference resource (RS) set, the plurality of TCI states being allocated to the UE by the DCI. In other words, when the UE receives DCI related to the TCI states, the UE may recognize that the second PDSCH scheduled for the UE (by the DCI or another DCI) is present, in addition to the first PDSCH scheduled by the DCI, so that the second PDSCH overlaps with the first PDSCH on a time resource.

Accordingly, the UE may receive the first PDSCH (scheduled by the DCI) based on one of RS sets related to (i) the above assumption and (ii) the plurality of TCI states (S1620 and S1720).

Additionally, the UE may receive the second PDSCH (S1620 and S1720). In this case, the second PDSCH may be scheduled by the DCI or another DCI as described above.

The BS may transmit the first PDSCH (and the second PDSCH) to the UE (S1620 and S1720).

The UE may acquire related data information from the one or more received PDSCHs (S1630 and S1730).

In the above configurations, when the first PDSCH and the second PDSCH overlap on a frequency resource as well as the time resource, the UE may receive the first PDSCH and the second PDSCH by differently configuring a first reception beam for the first PDSCH and a second reception beam for the second PDSCH. In this case, the UE may configure the first reception beam and the second reception beam based on the TCI states (and RS sets related to the TCI states) related to the DCI.

According to the present disclosure, the RS sets related to the plurality of TCI states may correspond to two RS sets. In other words, the DCI may be related to two TCI states and each TCI state may be related to one RS set.

In this case, the one RS set for receiving the first PDSCH may be determined as the first RS set or the second RS set of the two RS sets, based on a CW number activated by the DCI. In other words, the UE may consider the CW number activated by the DCI to configure an RS set (or reception beam) for receiving the first PDSCH.

As an example applicable to the present disclosure, the one RS set for receiving the first PDSCH may be determined as follows, based on determination that (i) the RS sets related to the plurality of TCI states correspond to two RS sets and (ii) one or more DMRS ports indicated by the DCI are included in different CDM groups. In other words, the UE may consider a CDM group to which a DMRS port related to the first PDSCH belongs in order to configure the RS set (or reception beam) for receiving the first PDSCH.

- The one RS set for receiving the first PDSCH is determined as the first RS set of the two RS sets, based on one or more DMRS ports related to the first PDSCH, included in the first CDM group.
- The one RS set for receiving the first PDSCH is determined as the second RS set of the two RS sets, based on one or more DMRS ports related to the first PDSCH, included in the second CDM group.

More specifically, when one or more DMRS ports related to the first PDSCH are included in the first CDM group, the one RS set for receiving the first PDSCH may be determined as the first RS set of the two RS sets. When one or more DMRS ports related to the first PDSCH are included in the second CDM group, the one RS set for receiving the first PDSCH may be determined as the second RS set of the two RS sets.

In the example, the UE may receive the second PDSCH scheduled by the DCI. In this case, the second PDSCH may be received based on an RS set different from the one RS set for receiving the first PDSCH among the two RS sets.

In the above example, the first CDM group and the second CDM group may be configured as follows, based on a first DMRS configuration type configured for the UE.

- The first CDM group includes DMRS port #0, DMRS port #1, DMRS port #4, and DMRS port #5.
- The second CDM group includes DMRS port #2, DMRS port #3, DMRS port #6, and DMRS port #7.

In the above example, the first CDM group and the second CDM group may be configured as follows, based on a second DMRS configuration type configured for the UE.

- The first CDM group includes DMRS port #0, DMRS port #1, DMRS port #6, and DMRS port #7.
- The second CDM group includes DMRS port #2, DMRS port #3, DMRS port #4, DMRS port #5, DMRS port #8, DMRS port #9, DMRS port #10, and DMRS port #11.

As another example applicable to the present disclosure, based on determination that (i) the RS sets related to the plurality of TCI states correspond to two RS sets and (ii) one or more DMRS ports indicated by the DCI are included in one CDM group, the one RS set for receiving the first PDSCH may be determined as one specific RS set of the two RS sets, without considering the one CDM group.

More specifically, the specific one RS set for receiving the first PDSCH may be determined as the first RS set or the second RS set of the two RS sets.

As another example applicable to the present disclosure, based on determination that (i) the RS sets related to the plurality of TCI states correspond to two RS sets and (ii) one or more DMRS ports indicated by the DCI are included in one CDM group, the one RS set for receiving the first PDSCH may be determined as the first RS set or the second RS set of the two RS sets, based on the one CDM group corresponding to a first CDM group or a second CDM group.

In a more specific example, according to whether one CDM group to which the one or more DMRS ports indicated by the DCI belong is the first CDM group or the second CDM group, the one RS set for receiving the first PDSCH may be determined as follows.

- The one RS set for receiving the first PDSCH is determined as the first RS set of the two RS sets based on the one CDM group corresponding to the first CDM group.

The one RS set for receiving the first PDSCH is determined as the second RS set of the two RS sets based on the one CDM group corresponding to the second CDM group.

In the present disclosure, overlapping of the first PDSCH and the second PDSCH on the time resource may include scheduling of the first PDSCH and the second PDSCH in at least one or more identical symbols.

In the present disclosure, all the above-described examples (in particular, based on FIGS. 16 to 18) may be implemented in combination/association with each other unless they are incompatible. In other words, the UE and the BS according to the present disclosure may perform combined/associated operation of all the described examples (in particular, based on FIGS. 16 to 18) as long as all the examples are not incompatible.

Since examples of the above-described proposal method may also be included in one of implementation methods of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the base station informs the UE of information as to whether the proposed methods are applied (or information about rules of the proposed methods) through a predefined signal (e.g., a physical layer signal or a higher-layer signal).

3. Device Configuration

Figure 19:
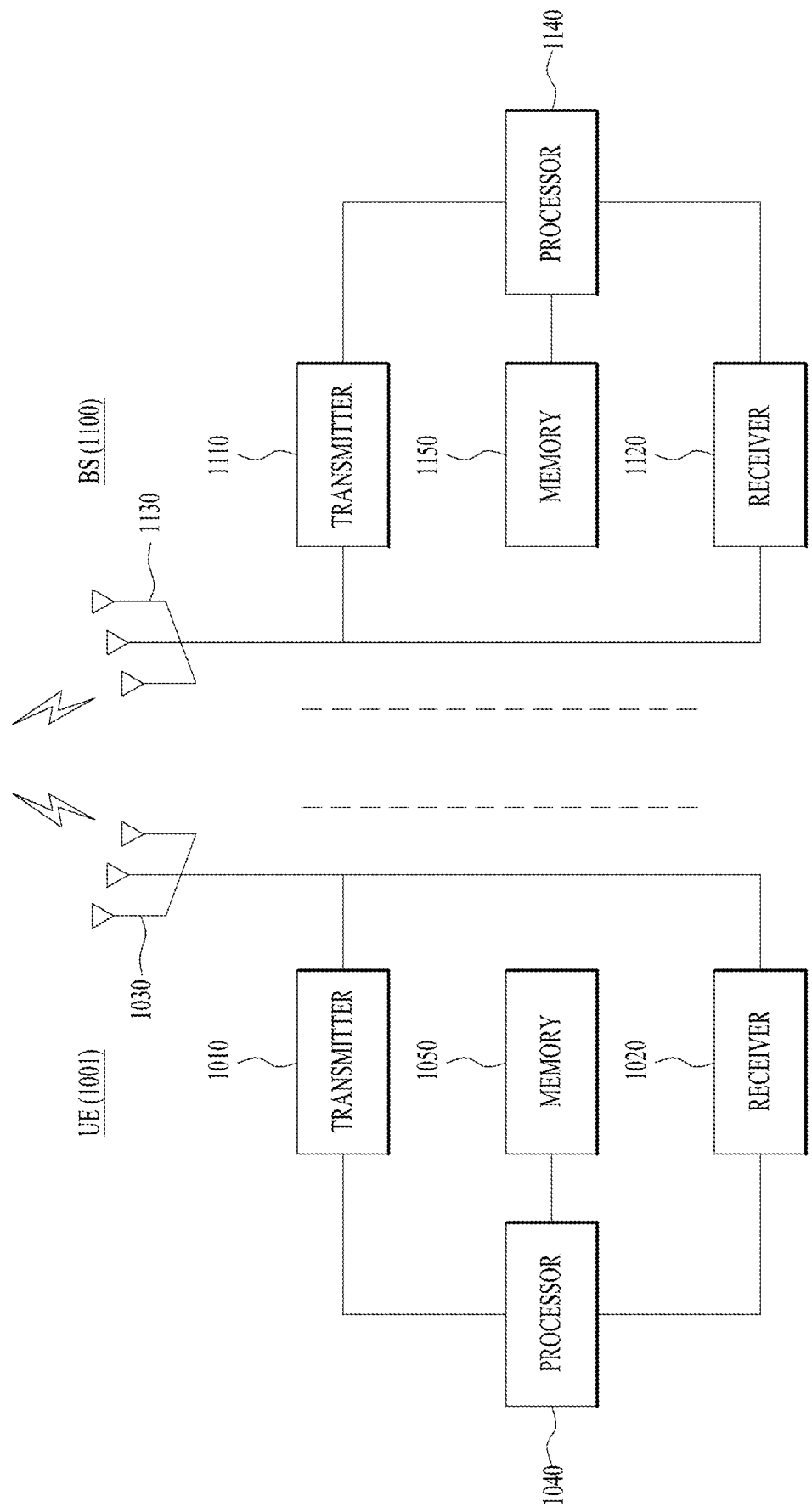
FIG. 19 is a diagram illustrating configurations of a UE and a BS by which proposed embodiments can be implemented.

FIG. 19 is a diagram illustrating configurations of a UE and a BS by which proposed embodiments can be implemented. The UE and the BS illustrated in FIG. 19 operate to implement the embodiments of the above-described DL signal transmission and reception method between the UE and the BS.

The UE 1001 may operate as a transmission end on UL and as a reception end on DL. The BS (eNB or gNB) 1100 may operate as a reception end on UL and as a transmission end on DL That is, the UE and the BS may include transmitters 1010 and 1110 and receivers 1020 and 1120, respectively, to control transmission and reception of information, data and/or messages and may include antennas 1030 and 1130, respectively, to transmit and receive information, data, and/ or messages.

The UE and the BS further include processors 1040 and 1140, respectively, for performing the above-described embodiments of the present disclosure. The processors 1040 and 1140 control memories 1050 and 1150, the transmitters 1010 and 1110, and/or the receivers 1020 and 1120, respectively, to implement the above-described/proposed procedures and/or methods.

For example, the processors 1040 and 1140 include communication modems designed to implement radio communication technology (e.g., LTE or NR). The memories 1050 and 1150 are connected to the processors 1040 and 1140 and store various information related to operations of the processors 1040 and 1140. As an example, the memories 1050 and 1150 may perform a part or all of processes controlled by the processors 1040 and 1140 or store software code including the above-described/proposed procedures and/or methods. The transmitters 1010 and 1110 and/or the receivers 1020 and 1120 are connected to the processors 1040 and 1140 and transmit and/or receive radio signals. The processors 1040 and 1140 and the memories 1050 and 1150 may be a part of a processing chip (e.g., system-on-chip (SoC)).

The transmitters and receivers included in the UE and the BS may perform a packet modulation and demodulation function, a high-speed packet channel coding function, an OFDMA packet scheduling function, and/or a channelization function, for data transmission. The UE and the BS of FIG. 19 may further include low-power radio frequency (RF)/intermediate frequency (IF) units.

Figure 20:
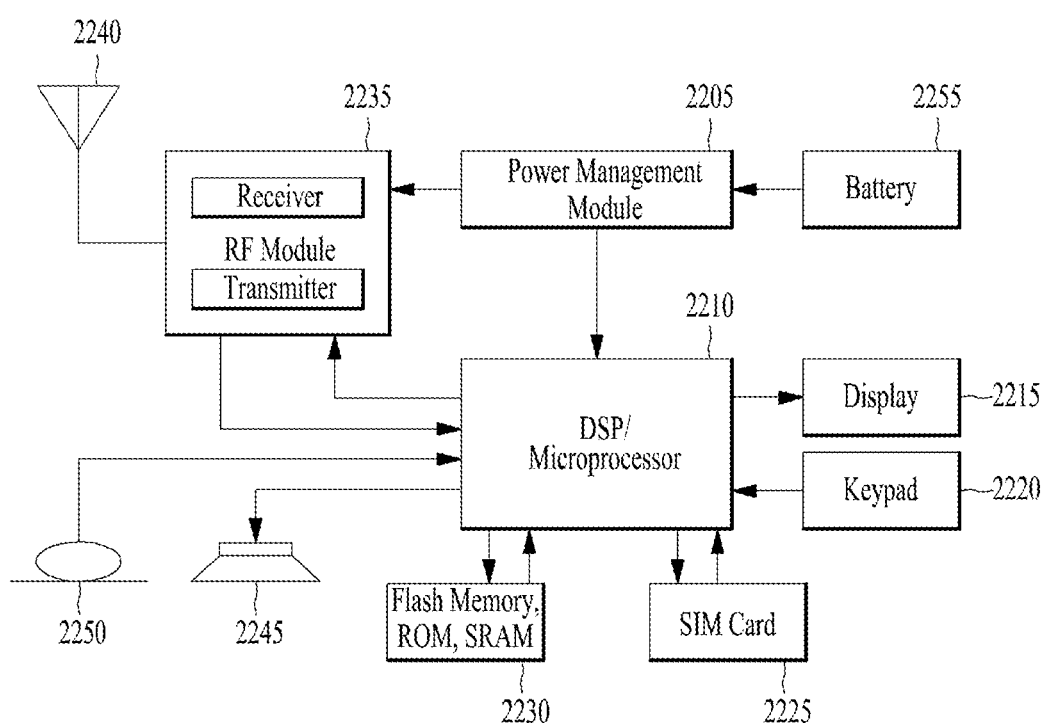
FIG. 20 is a block diagram of a communication device by which proposed embodiments can be implemented.

FIG. 20 is a block diagram of a communication device by which proposed embodiments can be implemented.

The device illustrated in FIG. 20 may be a UE and/or a BS (e.g., an eNB or a gNB) adapted to perform the above mechanism or may be any device for performing the same operation.

As illustrated in FIG. 20, the device may include a digital signal processor (DSP)/microprocessor 2210 and an RF module (transceiver) 2235. The DSP/microprocessor 2210 is electrically connected to the transceiver 2235 to control the transceiver 2235. The device may further include a power management module 2205, a battery 2255, a display 2215, a keypad 2220, a SIM card 2225, a memory device 2230, a speaker 2245, and an input device 2250, according to the selection of a designer.

Specifically, FIG. 20 illustrates a UE including the receiver 2235 configured to receive a request message from a network and the transmitter 2235 configured to transmit transmission or reception timing information to the network. The receiver and the transmitter may constitute the transceiver 2235. The UE may further include the processor 2210 connected to the transceiver 2235 (receiver and transmitter).

In addition, FIG. 20 illustrates a network device including the transmitter 2235 configured to transmit a request message to the UE and the receiver 2235 configured to receive transmission or reception timing information from the UE. These transmitter and receiver may constitute the transceiver 2235. The network further includes the processor 2210 connected to the transmitter and the receiver. This processor 2210 may be configured to calculate latency based on the transmission or reception timing information.

Thus, the processor included in the UE (or a communication device included in the UE) according to the present disclosure and the processor included in the BS (or a communication device included in the BS) according to the present disclosure may control the corresponding memories and operate as follows.

In the present disclosure, the UE may include at least one radio frequency (RF) module; at least one processor; and at least one memory operably connected to the at least one processor, for storing instructions for causing the at least one processor to perform a specific operation when the at least one processor is executed. In this case, the communication device included in the UE may be configured to include the at least one processor and the at least one memory. The communication device may be configured to include that at least one RF module or may be configured to be connected to at least one RF module without including the at least one RF module.

The at least one processor included in the UE (or at least one processor of the communication device included in the UE) may be configured to control the at least one RF module to receive DCI for scheduling one or more PDSCHs, assume that a second PDSCH scheduled for the UE is present so as to overlap with a first PDSCH scheduled by the DCI on a time resource, based on a plurality of TCI states related to one reference resource (RS) set, the plurality of TCI states being allocated to the UE by the DCI, and receive the first PDSCH based on one of RS sets related to (i) the assumption and (ii) the plurality TCI states.

The UE (or the communication device included in the UE) may be configured to communicate with at least one of a mobile terminal, a network, or a self-driving vehicle other than a vehicle in which the UE is included.

In the present disclosure, the BS may include at least one radio frequency (RF) module; at least one processor; and at least one memory operably connected to the at least one processor, for storing instructions for causing the at least one processor to perform a specific operation when the at least one processor is executed. In this case, the communication device included in the BS may be configured to include the at least one processor and the at least one memory. The communication device may be configured to include that at least one RF module or may be configured to be connected to at least one RF module without including the at least one RF module.

The at least one processor included in the BS (or at least one processor of the communication device included in the BS) may be configured to control the at least one RF module to transmit DCI for scheduling one or more PDSCHs to the UE. In this case, a first PDSCH scheduled by the DCI may be configured to overlap with a second PDSCH scheduled for the UE by the DCI or another DCI on a time resource. The at least one processor included in the BS (or at least one processor of the communication device included in the BS) may be configured to control the at least one RF module to transmitting the first PDSCH and the second PDSCH to the UE.

The UE in the present disclosure may use a personal digital assistant (PDA), a cellular phone, a personal communication service (PCS) phone, a global system for mobile (GSM) phone, a wideband code division multiple access (WCDMA) phone, a mobile broadband system (MBS) phone, a hand-held PC, a laptop PC, a smartphone, or a multi-mode multi-band (MM-MB) terminal.

In this case, the smartphone refers to a terminal taking the advantages of both a mobile communication terminal and a PDA and may be a terminal which incorporates functions of the PDA, i.e., a scheduling function and a data communication function such as fax transmission and reception and Internet connection, into the mobile communication terminal. The MM-MB terminal refers to a terminal which has a multi-modem chip therein and which can operate in any of a mobile Internet system and other mobile communication systems (e.g. a code division multiple access (CDMA) 2000 system, a WCDMA system, etc.).

Embodiments of the present disclosure may be implemented by various means, for example, hardware, firmware, software, or a combination thereof.

In a hardware implementation, methods according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software implementation, the methods according to the embodiments of the present disclosure may be implemented in the form of a module, a procedure, a function, etc. for performing the above-described functions or operations. For example, software code may be stored in the memory 11050 or 1150 and executed by the processor 1040 or 1140. The memory is located at the interior or exterior of the processor and may transmit and receive data to and from the processor via various known means.

The above-described communication device may be a BS, a network node, a transmission terminal, a wireless device, a wireless communication device, a vehicle, a vehicle having a self-driving function, an unmanned aerial vehicle (UAV), an artificial intelligence (AI) module, a robot, an augmented reality (AR) device, a virtual reality (VR) device, or the like.

For example, the UE may include a cellular phone, a smartphone, a laptop computer, a digital broadcast terminal, a PDA, a portable multimedia player (PMP), a navigation device, a slate PC, a tablet PC, an ultrabook, or a wearable device (e.g., a smartwatch, a smartglasses, or a head mounted display (HMD)). For example, the UAV may be an unmanned aircraft flying according to a wireless control signal. For example, the HMD is a display device wearable on the head, which may be used to implement VR or AR.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

Additionally, the embodiments of the present disclosure are applicable to various applications such as a self-driving vehicle, a UAV, etc.

What is claimed is:
1. A method for receiving a downlink signal by a user equipment (UE) in a wireless communication system, the method comprising:
receiving downlink control information (DCI) including information regarding a plurality of transmission configuration indication (TCI) states and information regarding a plurality of Demodulation Reference Signal (DM-RS) ports within two or more code division multiplexing (CDM) groups including a first CDM group and a second CDM group,
wherein the plurality of TCI states includes a first TCI state and a second TCI state, and
wherein the plurality of DM-RS ports includes one or more DM-RS ports for a first physical downlink shared channel (PDSCH) within the first CDM group and one or more DM-RS ports for a second PDSCH within the second CDM group; and
receiving the first PDSCH and the second PDSCH based on the DCI,
wherein the first TCI state is related to the first CDM group and the second TCI state is related to the second CDM group.

2. The method of claim 1,
wherein the first PDSCH is received based on a reference signal (RS) set related with the first TCI state, and the second PDSCH is received based on a RS set related with the second TCI state.

3. The method of claim 2,
wherein the UE receives the first PDSCH based on a first reception beam for the first PDSCH determined based on the RS set related with the first TCI state.

4. The method of claim 1,
wherein, the first PDSCH is overlapped with the second PDSCH on a time domain.

5. The method of claim 4,
wherein the first PDSCH is overlapped with the second PDSCH in at least one or more identical symbols.

6. The method of claim 1,
wherein, based on the UE configured with a first DM-RS configuration type:
the first CDM group includes DM-RS port #0, DM-RS port #1, DM-RS port #4, and DM-RS port #5, and
the second CDM group includes DM-RS port #2, DM-RS port #3, DM-RS port #6, and DM-RS port #7.

7. The method of claim 1,
wherein, based on the UE configured with a second DM-RS configuration type:
the first CDM group includes DM-RS port #0, DM-RS port #1, DM-RS port #6, and DM-RS port #7, and
the second CDM group includes DM-RS port #2, DM-RS port #3, DM-RS port #4, DM-RS port #5, DM-RS port #8, DM-RS port #9, DM-RS port #10, and DM-RS port #11.

8. A user equipment (UE) configured to receive a downlink signal in a wireless communication system, the UE comprising:
at least one receiver;
at least one processor; and
at least one memory operably connected to the at least one processor and storing instructions that, based on being executed, cause the at least one processor to perform operations comprising:
receiving downlink control information (DCI) including information regarding a plurality of transmission configuration indication (TCI) states and information regarding a plurality of Demodulation Reference Signal (DM-RS) ports within two or more code division multiplexing (CDM) groups including a first CDM group and a second CDM group,
wherein the plurality of TCI states includes a first TCI state and a second TCI state, and
wherein the plurality of DM-RS ports include one or more DM-RS ports for a first physical downlink shared channel (PDSCH) within the first CDM group and one or more DM-RS ports for a second PDSCH within the second CDM group;
and
receiving the first PDSCH and the second PDSCH based on the DCI,
wherein the first TCI state is related to the first CDM group and the second TCI State is related to the second CDM group.

9. The UE of claim 8,
wherein the UE communicates with at least one of a mobile terminal, a network, or a self-driving vehicle other than a vehicle in which the UE is included.

10. A base station (BS) configured to transmit a downlink signal in a wireless communication system, the BS comprising:
at least one transmitter;
at least one processor; and
at least one memory operably connected to the at least one processor and storing instructions that, based on being executed, cause the at least one processor to perform operations comprising:
transmitting, to a user equipment (UE), downlink control information (DCI) including information regarding a plurality of transmission configuration indication (TCI) states and information regarding a plurality of Demodulation Reference Signal (DM-RS) ports within two or more code division multiplexing (CDM) groups including a first CDM group and a second CDM group,
wherein the plurality of TCI states includes a first TCI state and a second TCI state, and
wherein the plurality of DM-RS ports include one or more DM-RS ports for a first physical downlink shared channel (PDSCH) within the first CDM group and one or more DM-RS ports for a second PDSCH within the second CDM group;
and
transmitting, to the UE, the first PDSCH and the second PDSCH based on the DCI,
wherein the first TCI state is related to the first CDM group and the second TCI State is related to the second CDM group.

* * * * *